United States Patent [19]

Tokunaga et al.

[11] Patent Number: 4,816,900
[45] Date of Patent: Mar. 28, 1989

[54] METHOD OF SEPARATION AND FORMATION OF A COLOR COMPONENT OF A COLOR IMAGE AND APPARATUS THEREFOR

[75] Inventors: Hiroshi Tokunaga; Jun-ichi Hamada; Masakazu Fukuchi, all of Hachioji, Japan

[73] Assignee: Konishiroku Photo Industry Co., Ltd., Tokyo, Japan

[21] Appl. No.: 115,541

[22] Filed: Oct. 28, 1987

Related U.S. Application Data

[63] Continuation of Ser. No. 711,079, Mar. 12, 1985, abandoned.

[30] Foreign Application Priority Data

| Mar. 19, 1984 | [JP] | Japan | 59-52950 |
| Jun. 28, 1984 | [JP] | Japan | 59-133985 |
| Jun. 28, 1984 | [JP] | Japan | 59-133986 |
| Jun. 28, 1984 | [JP] | Japan | 59-133988 |
| Jun. 28, 1984 | [JP] | Japan | 59-133989 |
| Jun. 28, 1984 | [JP] | Japan | 59-133990 |

[51] Int. Cl.$^4$ .......................... H04N 1/46; H04N 1/40
[52] U.S. Cl. .......................... 358/75; 356/425
[58] Field of Search .............. 358/75; 382/17, 58; 356/416, 425, 402, 406, 411, 414; 250/226

[56] References Cited

U.S. PATENT DOCUMENTS

| 4,470,702 | 9/1984 | Matsumoto et al. | 356/404 |
| 4,479,242 | 10/1984 | Kurata | 358/75 |
| 4,527,897 | 7/1985 | Okabe | 356/407 |
| 4,551,022 | 11/1985 | Tagaya | 356/406 |
| 4,551,750 | 11/1985 | Kurata | 358/75 |
| 4,569,584 | 2/1986 | St. John et al. | 358/75 |
| 4,577,218 | 3/1986 | Kurata | 358/75 |

Primary Examiner—James J. Groody
Assistant Examiner—Robert M. Bauer
Attorney, Agent, or Firm—Jordan B. Bierman

[57] ABSTRACT

A method of forming an electric signal wherein the signal level corresponding to the selected color in the original indicates the maximum or minimum value. The original is exposed to the light and the reflected light is introduced into a photoelectric converting means through two different paths, each of which has a filter corresponding to a different selected color. These two signals are multiplied by a predetermined ratio, and are combined to obtain the final image signal.

9 Claims, 24 Drawing Sheets (a)

(a)

METHOD OF SEPARATION AND FORMATION OF A COLOR COMPONENT OF A COLOR IMAGE AND APPARATUS THEREFOR

This application is a continuation of application Ser. No. 711,079 filed Nov. 12, 1985 now abandoned.

BACKGROUND OF THE INVENTION

The present invention relates to a method of the formation of an image and an apparatus used therefor, and more particularly to a method and apparatus, e.g., an image-reading method and apparatus or image-reproducing method and apparatus, which are capable of processing by separating and synthesizing in a simple manner a color image consisting of chromatic and achromatic color components or of different chromatic color components.

As the process for the formation of a color image, there are conventionally known processes for the image signal processing such as, for example, the color printing process, electrophotographic process, color scanner process, and the like. Any of these processes requires for the image formation the obtaining of pieces of information of three colors by separating the original image color into three primary colors (blue (B), green (G) and red (R)). For example, according to the prior-art full-color-process electrophotographic copier, a photoreceptor, after being corona-charged, is exposed through a red filter to the light from an original and then developed by a cyan developer, and the resulting visible cyan image is once transferred onto a copying paper. Next, in like manner, the photoreceptor is exposed through a green filter and developed by a magenta developer, and the formed visible magenta image is then transferred with registering onto the above cyan image on the same copying paper. Further, the same manner is repeated with use of a blue filter and yellow developer to form a visible yellow image registered on the foregoing two-color image on the same copying paper. And the three-color-superposed image, if necessary, is fixed, whereby a final color image is obtained.

On the other hand, the image formation based on two-color information is known as a masking technique, by the color correcting method used in the color printing process. According to the positive masking technique, color correction is performed in each color printing plate making process by superposing upon an uncorrected color-separated negative image a required density-having color-separated positive image prepared from a different color-separated negative.

The multicolor copying method include a method which uses an NP photoreceptor. For example, Japanese Patent Examined Publication No. 34770/1973 discloses a method in which a photoreceptor is exposed imagewise through a red filter and at the same time positively charged, then exposed imagewise through a cyan filter and simultaneously negatively charged or A.C.-charged to form thereon an electrostatic latent image for red color only, and then, after the latent image's red-color development and transfer onto a copying paper, is further subjected to another electrostatic latent image formation for black only in usual manner, which is then developed to a black image to be transferred onto the same copying paper. Also, Japanese Patent Examined Publication No. 33066/1980 discloses a method which provides a two-color image in the manner that a photoreceptor is subjected to an overall exposure and positive charging at the same time, then to an imagewise exposure through a cyan filter and negative or A.C. charging at the same time, and further to an imagewise exposure through a red filter to thereby form electrostatic latent images for red and black to be charged to opposite polarities to each other, and the respective latent images are developed with opposite-polarity toners to each other to form a two-color image to be transferred onto a copying paper.

However, in the method using the above NP photoreceptor, the simultaneous performing of the charging and exposure is essential for its process, but it is not easy to control both exposed and unexposed areas so as to be charged under the same condition because of the difference in the condition of the photoreceptor between the exposed and unexposed areas. Moreover, since the imagewise exposure and charging are performed simultaneously it is relatively difficult to maintain the charged potential sufficiently. In the process using the NP photoreceptor, in the case of the double-imagewise exposure process, it is difficult to eliminate the black image (particularly fine lines), while in the case of the single imagewise exposure process, it is difficult to secure sufficiently the potentials of both black and red images. And in the case of the process using a photoreceptor of a large carrier transit time (e.g., an organic semiconductor), the photoreceptor's sensitivity tends to be deteriorated.

On the other hand, there is a different multicolor copying process which uses a composite photoreceptor comprised of a red-light-insensitive layer superposed on an at least red-light-sensitive layer, as disclosed in Japanese Patent Publication Open to Public Inspection (hereinafter referred to as Japanese Patent O.P.I. Publication) No. 3537/1979. According to this process, a primary charging is performed with uniform exposure so that the upper photosensitive layer alone becomes photoconductive, and then a secondary opposite-polarity charging is performed in the dark, and further an imagewise exposure is performed to thereby eliminate the charge in the corresponding region to the white image area and to leave the charge of the red-light-insensitive layer in only the corresponding region to the red image area, and thus its surface potential's polarity is made opposite to that of the black area.

In this method of the prior art, however, the construction of the photoreceptor is so complex that its preparation is difficult, and besides, the electric potential's stability during the repeated use of the photoreceptor is deteriorated by the influence of the above respective photosensitive layers' residual potentials, and the like.

Also, according to the known full-color-process electrophotographic copier, for example, the photoreceptor, after its corona charging, is exposed through a red filter to the light from an original image and developed by a cyan developed, and the thus obtained visible cyan image is once transferred onto a copying paper. Next, in like manner, the photoreceptor is exposed through a green filter, then developed by a magenta developer, and the resulting visible magenta image is then transferred in register with the above cyan image. Further, the same process is repeated with use of a blue filter and an yellow developer to form a visible yellow image, which is then transferred with registering onto the above two-color image, and then the formed three-color image, if necessary, is fixed, whereby the final color image is obtained.

There is a subtractive color image reproduction process similar to the above color process. This is known as the color scanner process.

In addition, there is also known a copying process which uses a photosensitive screen having a number of apertures (particularly fine-mesh apertures) on which is formed an electrostatic image, by which is controlled the passage of the charge particles' flow (e.g., positive ionic particles) to thereby form a given electrostatic image on a chargeable layer (e.g., the photosensitive layer of the photoreceptor).

For the above photosensitive screen method, a NP screen photoreceptor disclosed in Japanese Patent Examined Publication No. 31376/1979, which is comprised of a photoconductive layer and an insulating layer provided in the described order on a screen base. An electrophotographic process which uses this NP screen photoreceptor, as disclosed in, e.g., Japanese Patent Examined Publication No. 27144/1979, comprises the application of a primary charging to the screen photoreceptor, the simultaneous application of a secondary charging (A.C. or D.C.) and imagewise exposure, and the application of an overall exposure in the described order.

A technique of an electrophotographic process to which is applied the masking technique used in the printing plate making process is disclosed in Japanese Patent O.P.I. Publication No. 3430/1977. According to this prior art, a first electrostatic image is formed on a photoreceptor, and a second electrostatic image is formed on a photosensitive screen. In accordance with this second electrostatic image, a charge flow of opposite polarity to that of the first electrostatic image is projected upon the first electrostatic image to thereby correct the same. By this process, for example, magenta color can be reproduced, but it is no more than a process only for color correction. Accordingly, it is not for the purpose of separating the chromatic color components from the achromatic components, and particularly chromatic color signal levels can not be separated into two groups to be formed on both sides of the achromatic color signal levels.

In those copying processes of the prior art, in order to obtain a black image, yellow, magenta and cyan colors are superposed, but the blackness reproducibility and registering accuracy are not satisfactory.

SUMMARY OF THE INVENTION

It is therefore an object of this invention to provide a method and apparatus capable of sharply, highly accurately, easily controllably reproducing a desired image from an original image consisting of chromatic and achromatic components.

That is, the present invention includes a method for the formation of a color image comprising an optical process for obtaining a plurality of components of color image information from an original image, a synthesis process for synthesizing the foregoing plurality of components of color image information so that chromatic color signal levels are separable from the achromatic color signal levels, and a selection process as a supplementary process for selecting in synthesizing components of color image information the color signal levels of specific colors, i.e., all or part of the chromatic color signal levels from the achromatic color signal levels; and an apparatus comprising means required for satisfying the foregoing optical, synthesis and selection processes.

Further, in the case where the formation of a color image is carried out by a developing toner, the selection process and the means therefor may be provided with an electric control process and electic control mechanism, respectively, for the toner development.

In addition, the color image formation from an original image may be the light either reflected from or transmitted through an original image.

DETAILED DESCRIPTION OF THE INVENTION

The present invention will be first described collectively and then illustrated in detail with reference to examples.

Figure 1:
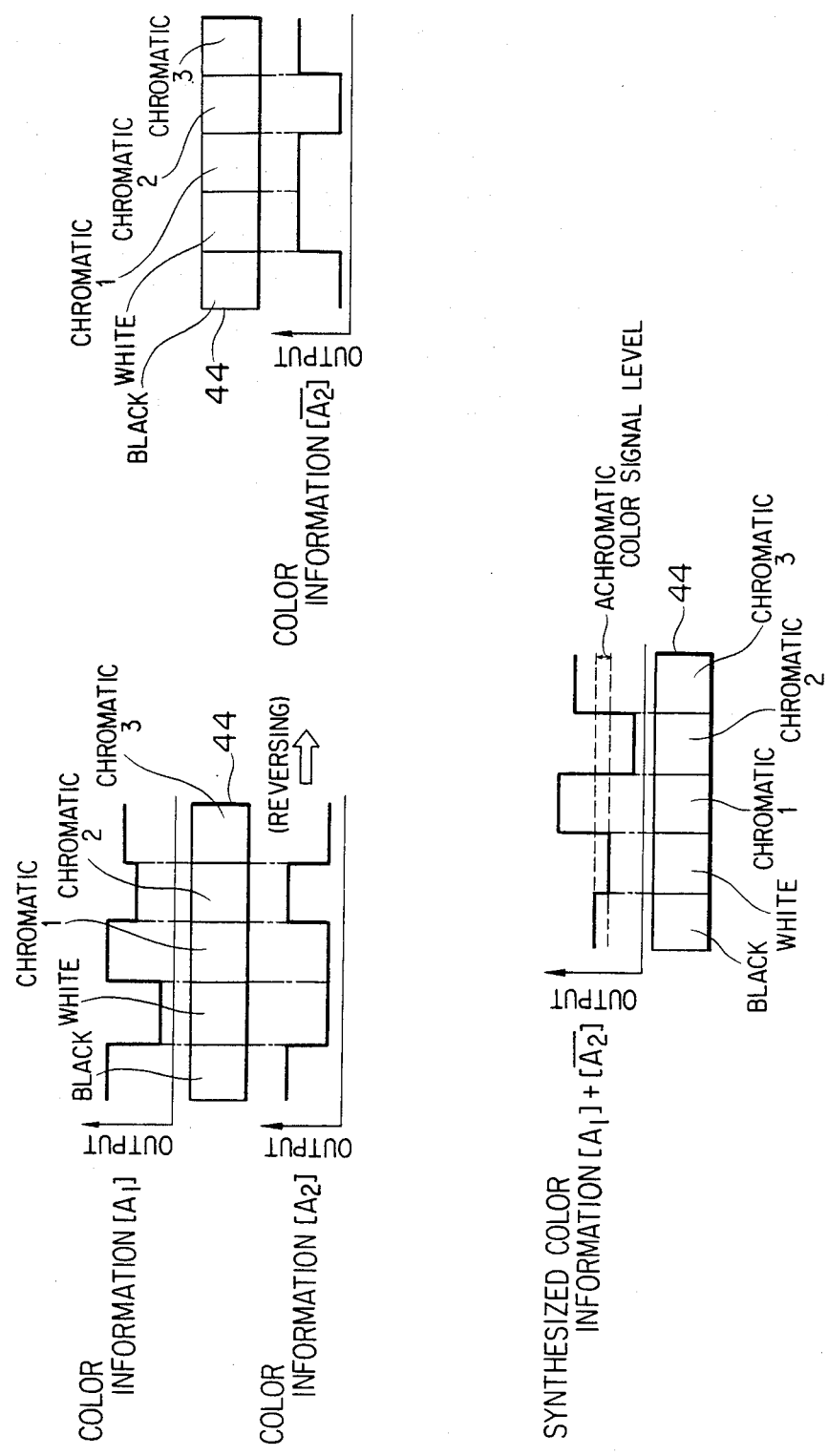
FIG. 1 is a diagram showing the fundamental process for the selection and synthesis of chromatic color signal levels during the color image formation.

The construction of this invention will be first mentioned collectively with the preferred embodiment of the present invention, wherein components of color information $[A_1]$ and $[\overline{A_2}]$, which have inverted relation with each other, are synthesized to thereby separate the components of chromatic color information into two levels to be formed on both sides of the achromatic color signal levels. Taking different components of color information out of an original image can be effected by, e.g., exposure of an original image to different wavelength-range lights. As is shown in FIG. 1, when an original image is exposed to the light of color $[A_1]$, a color information $[A_1]$ output signal can be obtained. In like manner, if the original is exposed to the light of color $[A_2]$, then a color information $[A_2]$ output signal can be obtained. These output signals may be either of the electric potential of a photoreceptor or of the output voltage or current of a light-receiving element. Such output signals may be obtained not only by the exposure to the above-mentioned different wavelength-range lights but also by use of different filters filtering the light from an original image. In synthesizing the above-mentioned two different components of color information, as is shown in FIG. 1, either one of the components of information, e.g., $[A_2]$ is inverted to be $[\overline{A_2}]$. In the synthesis of information, e.g., $[A_1]+[\overline{A_2}]$, the chromatic color signal levels are separated into ones on both sides (upper and lower) of the achromatic color signal levels. On the basis of the achromatic color signal levels the above respective chromatic colors are separately developed, whereby a desired color (monochromatic or mixed color)-having color image can be obtained.

Figure 2:
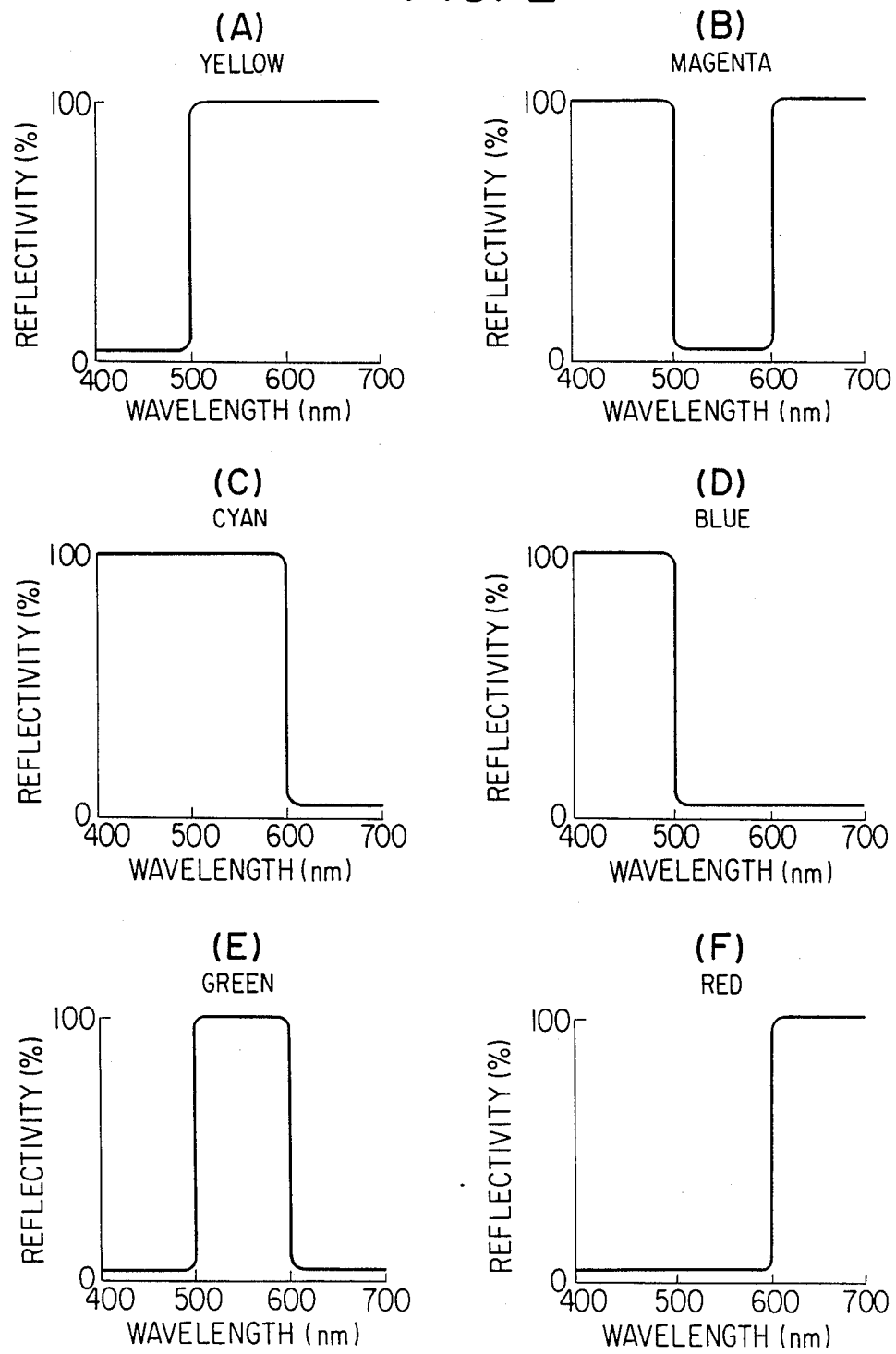
FIGS. 2(A), (B), (C), (D), (E) and (F) are the drawings showing the spectra of the respective chromatic color lights.

In addition, for understanding the characteristics of colors by various filters to be used in the following examples, FIG. 2 is provided to show the reflectivities of various colors: yellow (Y), magenta (M), cyan (C), blue (B), green (G) and red (R).

A typical example of this invention will now be illustrated from the standpoint of apparatus.

Figure 3:
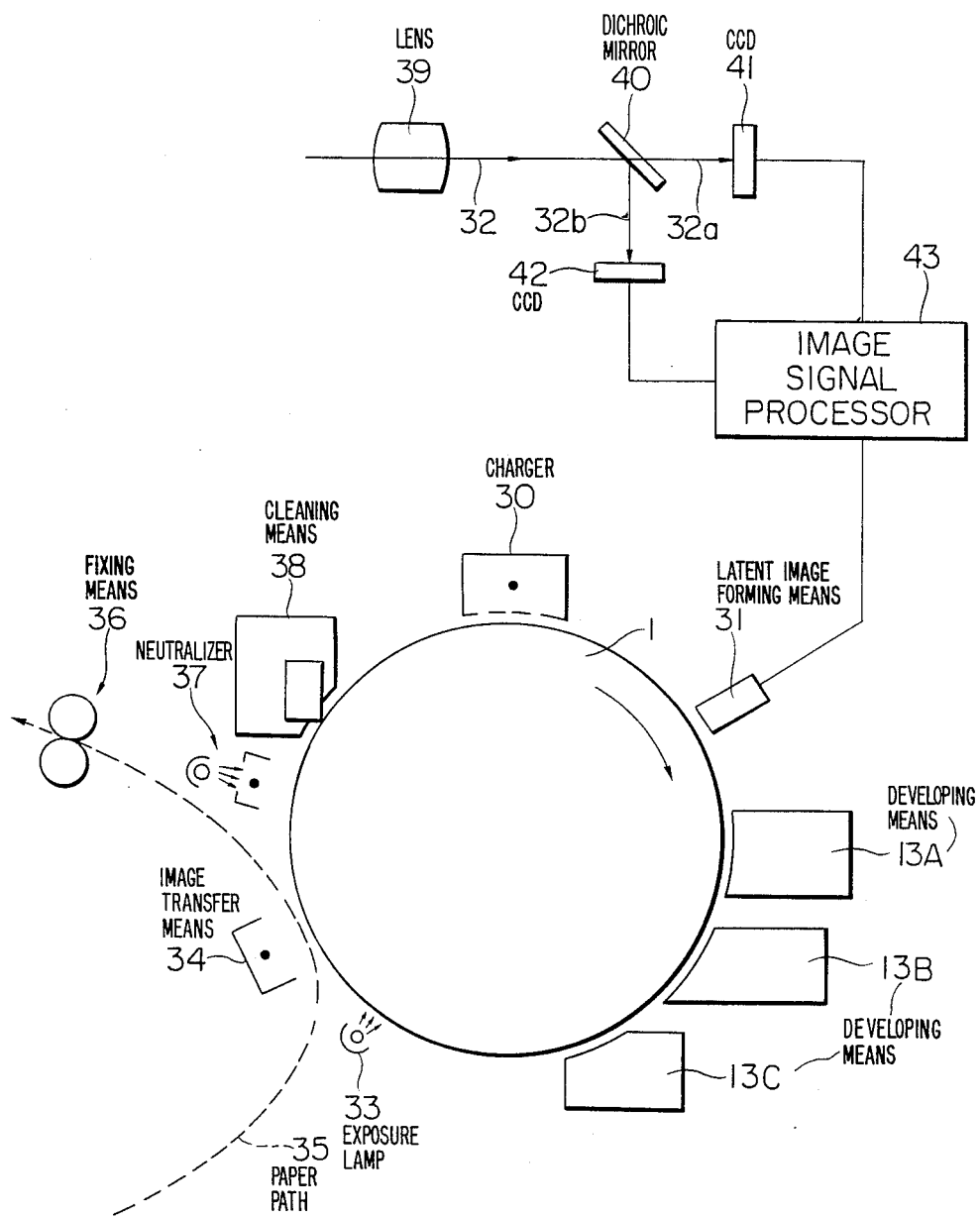
FIG. 3 is a schematic drawing showing an example of the color image forming apparatus.

FIG. 3 is a schematic drawing showing a principal part of an example of the color image forming apparatus for use in practicing the method of this invention. In this apparatus, a photoreceptor drum 1, which is uniformly charged thereon by a Scorotron charger 30, has an electrostatic latent image formed thereon as a result of being exposed imagewise to the light pattern correspoinding to an original image or document (not shown) by an electrostatic latent image forming means 31. This electrostatic latent image consists of components of image information synthesized so that chromatic and achromatic color signal levels become separable as will be described hereinafter in accordance with this invention. Accordingly, this electrostatic latent image is developed in order into visible various colors or mixed colors by developing means 13A, 13B, 13C . . . that are arranged aroung photoreceptor drum 1 (in actual practice, as many developing means as the number of desired colors are to be arranged). After the visualized toner image of various colors has been thus formed on the photoreceptor drum 1, an exposure lamp 33, before the transfer of the image, projects its light upon the region where the toner image is formed, and an image transfer means 34 then transfers the formed image onto a copying paper that has been transported from a paper feed means (not shown)(the course of the paper movement is shown with a broken line 35). The image-copied paper is then thermally fixed by a fixing means 36 consisting of rollers at least one of which is heated, and then ejected to the outside of the apparatus.

On the other hand, the photoreceptor drum, after completion of the image transfer, is neutralized by a neutralizer 37 that was not in use during the toner image formation, and then the residual toner remaining on the surface of the drum is removed by a cleaning means 38 that was released during the toner image formation.

In the above color image forming apparatus, the latent image forming means 31 (e.g., laser light) is supplied with an output obtained by the image processing of the image information in the light reflected from or transmitted through an original image.

That is, reflected light 32 is led through a lens 39 to a dichroic mirror 40, at which the light is divided into given wavelength-range lights 32a and 32b. The lights 32a and 32b are then made incident upon solid image sensor, e.g., CCD (Charge Coupled Device) 41 and 42, respectively, and thus the respective CCD outputs are obtained. These are then fed into an image signal processor 43, at which moment, for example, the output level from CCD 42 is inverted to be synthesized with the output from CCD 41. The synthesized signal is then sent to latent image forming means 31, whereby an electrostatic latent image corresponding to the above synthesized signal is formed on photoreceptor drum 1, and the latent image, in accordance with the foregoing respective chromatic color signals based on the achromatic color signal level, is separately developed, thereby giving a desired color (monochromatic or mixed color)-having color image.

The present invention will now be illustrated in detail. The present invention is such that the color image information from an original image is separated into the foregoing chromatic color signal levels, which are then synthesized, and these operations come up to the stage where the image development is carried out. Since the fundamental of the operations lies in the separation and synthesis, the description will be centered on the separation of the chromatic color signal levels into two groups and the synthesis thereof as the basic operations.

In FIG. 4(a), original image 44, as in the Figure, is supposed to comprise an image region consisting of chromatic components green G, yellow Y, red R, magenta M, blue B and cyan C, and another region consisting of monochromatic components white w and black b. The light 32 corresponding to the original image is made incident upon a dichroic mirror 40 that reflects, for example, the light of B and G components, and allows the transmission therethrough of the light of R component. As a result of the foregoing separating operation, from the dichroic mirror 40 the light of B and G components is incident upon CCD42 and the light of R component is incident upon CCD 41, and from the CCD42 and CCD 41 are obtained output levels [R] and [C], respectively, as shown in the output level charts of FIG. 4(a).

Hereupon, in making a synthesized signal level [S] by the synthesis of the above output levels [R] and [C], the [R] and [C] can be multiplied by arbitrary constants a and b including 1 which means no control. Further, in order to make the color separation clearer, either one of

[R] and [C] may be selected, for example, [C] may be selected, to be inverted. The inverting operation is represented by *(−1).

$$[S] = a[R] + b[C] \text{ or}$$

$$[S^*] = a[R] + b[C^* (-1)]$$

If $C^*(-1) = \overline{C}$, then $$[S^*] = a[R] + b[\overline{C}]$$

Now, if $a = b = 1$, and if the output [C] from CCD42 is inverted to be synthesized with the output [R] from CCD 41, then $$[S^*] = [R] + [\overline{C}]$$

Figure 4:
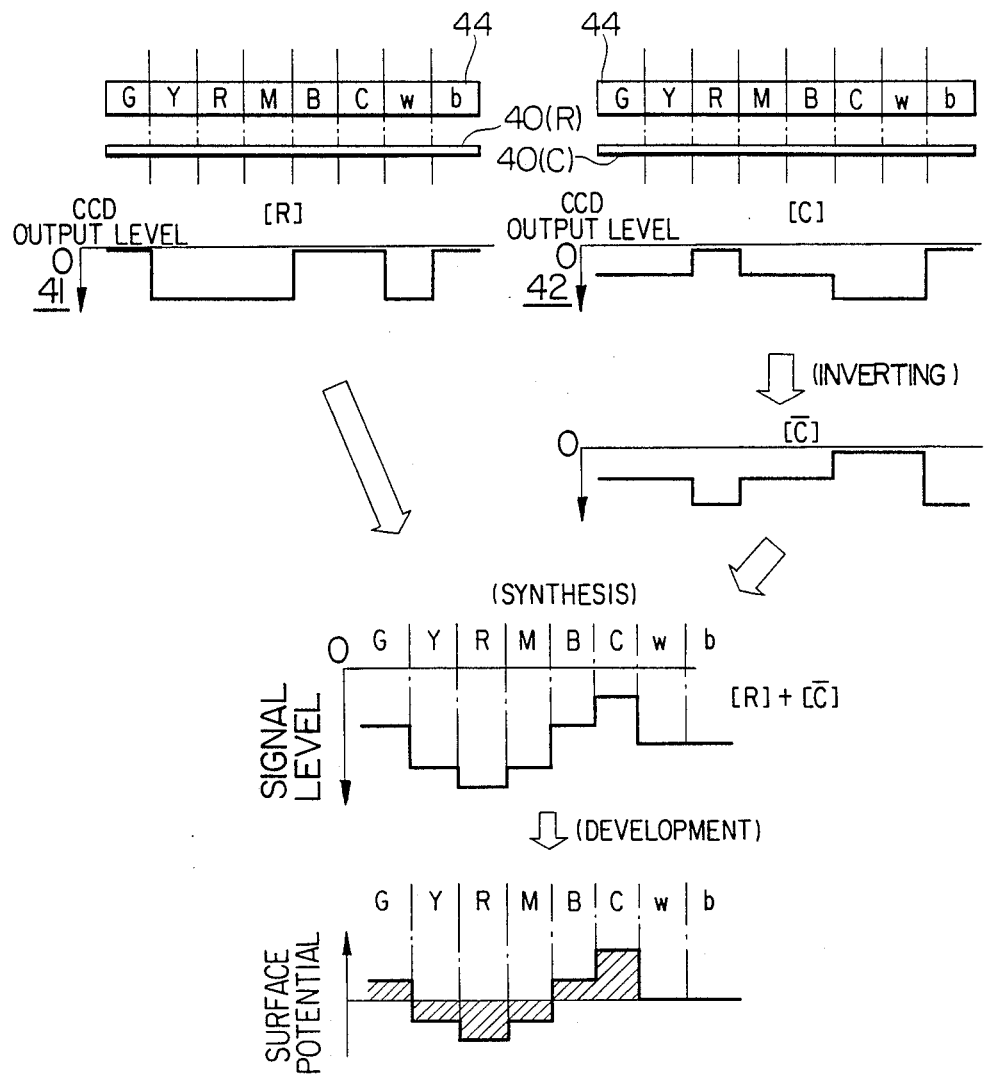
FIGS. 4, 5, 6 and 7 are explanatory drawings of the color image forming process by use of the color image forming apparatus of FIG. 3, and the (a) of each drawing is an output level chart, and the (b) of each drawing is a graph showing level variables.

And in accordance with the synthesized signal level $[S^*] = ([R] + [C])$, from latent image forming means 31 the light in a quantity of light corresponding to each of the respective color signal levels is projected upon photoreceptor drum 1 (imagewise exposed), whereby on the photosensitive layer of photoimage receptor drum 1 is formed an electrostatic latent image composed of various colors consisting of the potentials corresponding to the synthesized signal waveform as shown in FIG. 4.

The thus obtained electrostatic latent image is separated into a first group of chromatic color signal levels (G, B and C) and a second group of chromatic color signal levels (M, Y and R), both groups being formed on both sides of the achromatic color signal levels (w, b), and these groups are separable from the achromatic color signal levels. Accordingly, on the basis of the achromatic color signal levels, the respective chromatic colors of the above first and second groups are separately developed, whereby a desired color (monochromatic or mixed-color)-having color image can be obtained (the oblique-lined area in FIG. 4 represents the developable region: the same will apply hereinafter).

In this instance, the synthesized color signal output level [S*] and their member color signal output levels [R] and [C] for the respective image color components are as follows:

|       | Component |   |   |   |   |   |   |   |
|-------|-----------|---|---|---|---|---|---|---|
|       | G | Y | R | M | B | C | w | b |
| [R]   | 1 | 0 | 0 | 0 | 1 | 1 | 0 | 1 |
| [$\overline{C}$] | $\frac{1}{2}$ | $\frac{1}{2}$ | 0 | $\frac{1}{2}$ | $\frac{1}{2}$ | 1 | 1 | 0 |
| [S*]  | $a + \frac{b}{2}$ | $\frac{b}{2}$ | 0 | $\frac{b}{2}$ | $a + \frac{b}{2}$ | $a + b$ | b | a |

(In the table, the difference between the signal level w and the signal level b is 1)
wherein the absolute values of a and b are arbitrary, and since only the ratio of a to b is in question, the k as given below can be introduced:

$$\frac{a}{a+b} = k \ (0 < k < 1)$$

$$\frac{b}{a+b} = 1 - k$$

$$a{:}b = k{:}(1-k)$$

Accordingly, $$[S^*]/(a+b) = k[R] + (1-k).$$

Now, if $[Z] = [S^*]/(a+b)$, from the above table the color signal levels for the respective image color components are as given in the following table.

|     | G | Y | R | M | B | C | w | b |
|-----|---|---|---|---|---|---|---|---|
| [Z] | $\frac{1+k}{2}$ | $\frac{1-K}{2}$ | 0 | $\frac{1-k}{2}$ | $\frac{1+k}{2}$ | 1 | 1 − k | k |

Figure 4B:
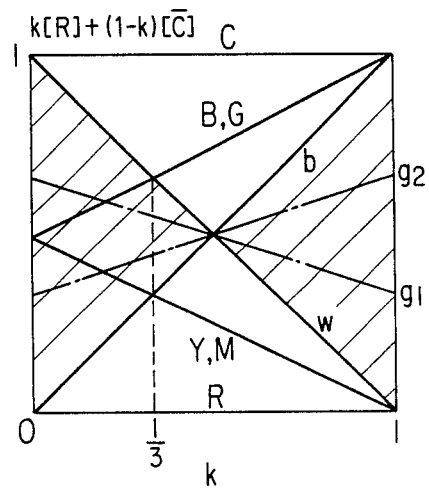

This relation, if k is taken on the axis of abscissa and [Z] on the axis of ordinate for each color signal level, is as shown in FIG. 4(b)(hereinafter called "level variable graph"). In the figure, the area indicated with oblique lines shows the achromatic color signal levels (the same shall apply hereinafter).

That is, if the vector represented by the coordinate points in the figure is expressed as (k[Z])(value k shall be placed before value [Z] hereinafter), the straight line between (0,0) and (1,1)(diagonal) represents the color signal level of b, and the line between (0,1) and (1,0) represents the color signal level of w. Therefore, the color signal level of grey g shows in each k a medium value between the color signal values of b and w, and the straight line representing the color signal level of g passes the point ($\frac{1}{2}$, $\frac{1}{2}$).

Also, in the synthesized color signal level [S*], the color signal levels of B and G are indicated by the straight line between (0, $\frac{1}{2}$) and (1, 1), the color signal levels of Y and M are indicated by the straight line between (0, $\frac{1}{2}$) and (1, 0), C by the straight line between (0,1) and (1, 1), and R by the line between (0, 0) and (1,0). Regardless of the value of k, [Z] for C = 1 and [Z] for R = 0.

If the straight line representing a chromatic color signal level falls on the color signal level of w or b, or is included in the foregoing region of grey, the chromatic color signal level part can not be separated from the achromatic color signal level. In this instance, a different optical separation method and the selection of k according thereto can be taken.

As may be understood from the level variable graph shown in FIG. 4(b), if a filter characteristic of dichroic mirror 40 is selected along with the selection of values of the above constants a and b and if k is $\frac{1}{3} < k < 1$, then all the chromatic (G, Y, R, M, B and C) color signal levels can be separated from the achromatic (w, b) color signal levels. In this case, for example, as in FIG. 4(a), if the selection is made so that a = 1, b = 1, i.e., k = $\frac{1}{2}$, the foregoing separation becomes possible.

On the other hand, as for C and R, regardless of the value of k (as mentioned previously 0 < k < 1), the achromatic signal level can be separated.

Figure 5B:
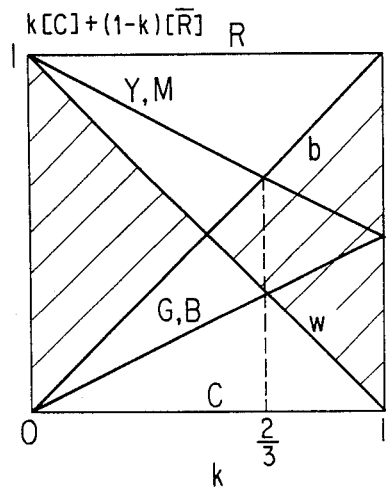

FIG. 5(a) shows an output level chart in the case where the filter's function in FIG. 3 is reversed (i.e., the k component light is reflected from and the B and G component lights are transmitted through mirror 40). Therefore, the synthesized signal level $[S^*](k[C] + (1-k)[\overline{R}])$ gives a level variable graph as shown in FIG. 5(b), wherein k is $0 < k < \frac{2}{3}$, whereby all the chromatic color signal levels can be separated from the achromatic color signal levels. In this instance, the selection should be made so that, e.g., as shown in FIG. 5(a), $$a = 3, b = 2 \left( k = \frac{3}{5} \right).$$

Further, as can be read from FIG. 5(b), if $$\frac{2}{3} \leq k < 1,$$

the specific chromatic color signal levels R and C can be separated from the achromatic color signal levels. In this case, for example, a=3 and b=1 should be selected.

Figure 6B:
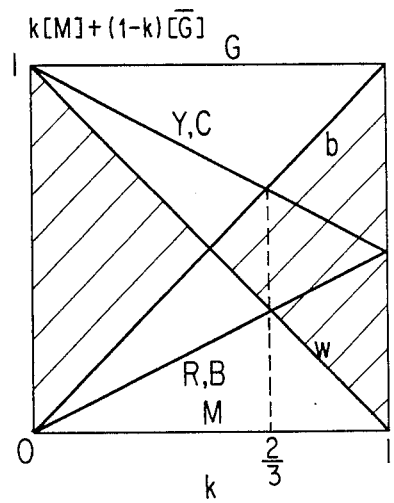
Figure 6A:
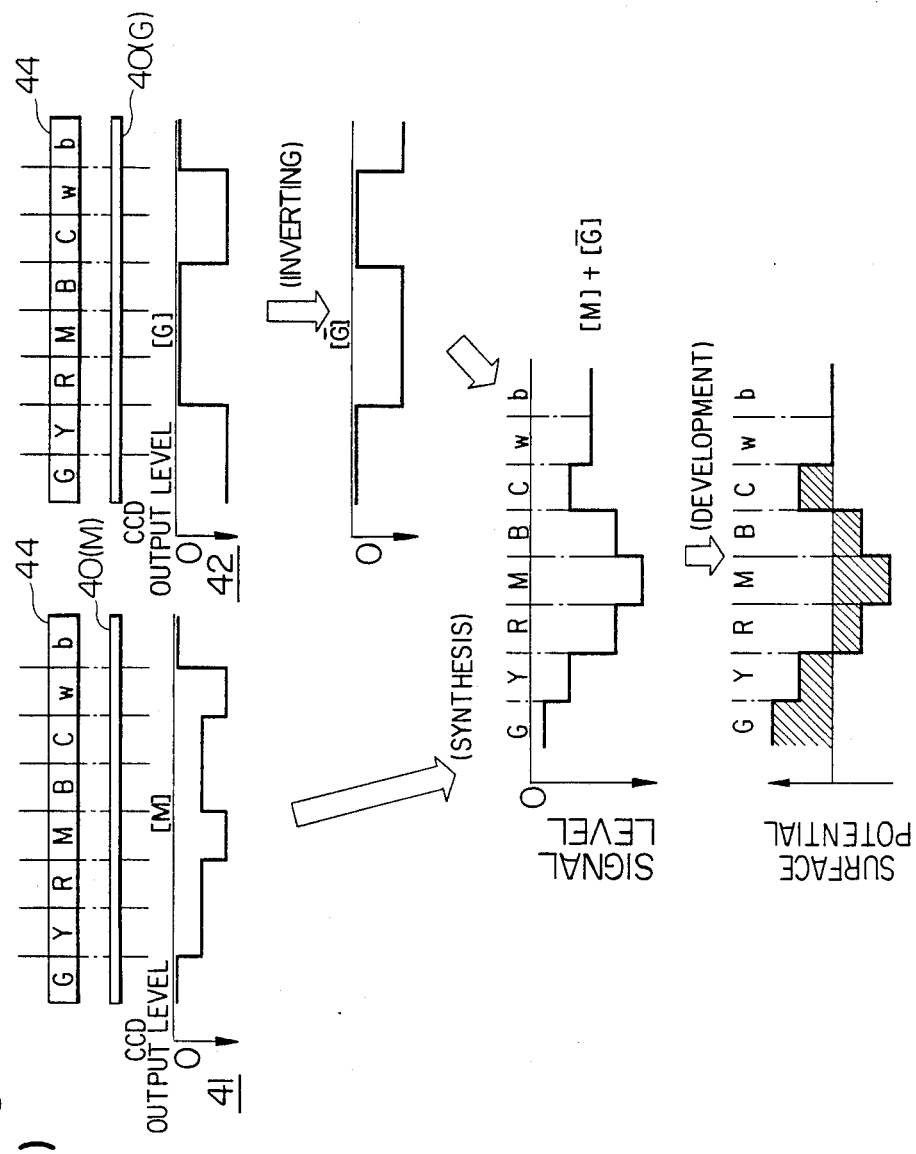

FIG. 6 shows an example of the case where a dichroic mirror 40 that reflects the G component light and allows the transmission of the B and R component lights therethrough is used. Therefore, the output level chart of CCD41 and CCD42 is as shown in FIG. 6(a), and of these the output of CCD42 is inverted to be $[\overline{G}]$, and when synthesized with the other output [M], the synthesized signal level $[S^*](a[M]+b[G])$ and the level variable graph of $(k[M]+(1-k)[\overline{G}])$ are as follows:

| | Image color components | | | | | | |
|---|---|---|---|---|---|---|---|
| | G | Y | R | M | B | C | w | b |
| a[M]+ b[G] | a+b | $\frac{a}{2}+b$ | $\frac{a}{2}$ | 0 | $\frac{a}{2}$ | $\frac{a}{2}+b$ | b | a |
| k[M] + (1 − k)[$\overline{G}$] | 1 | $1-\frac{k}{2}$ | $\frac{k}{2}$ | 0 | $\frac{k}{2}$ | $1-\frac{k}{2}$ | 1−k | k |

This level variable graph is as shown in FIG. 6(b). If $0<k<\frac{2}{3}$, all the chromatic color signal levels can be separated from the achromatic color signal levels. For example, k=½ which is advantageous for the selection from the level variable graph may be selected to make a=b=1 (giving the output level chart of FIG. 6(a)), or k=¼ may be selected to make a=1 and b=3. Further, if $$\frac{2}{3} \leq k < 1,$$

from the achromatic color signal levels (w and b), the chromatic color signal levels of G and M alone can be selected. In this instance, for example, [S*] may be synthesized with a=3 and b=1 from k=¾. In addition, the chromatic colors of G and M, regardless of whether the chromatic color signal levels of the other chromatic colors Y, C, R and B are separated or not from the achromatic color signal levels, can be separated from the whole 0<k<1 region.

FIG. 7 shows another example, wherein in place of the above-mentioned dichroic mirror 40, a half mirror is used, and in the paths 32a and 32b are arranged a green filter GF and a neutral density filter ND, respectively (ND filter is allowed to be omitted).

Figure 7B:
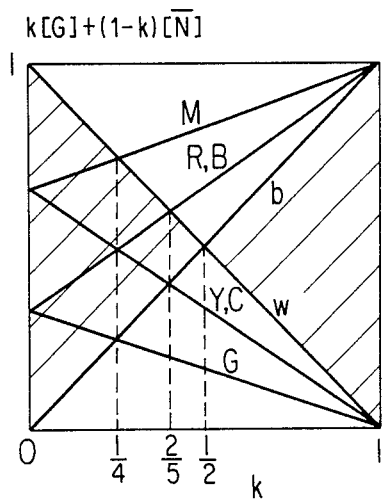
Figure 5:
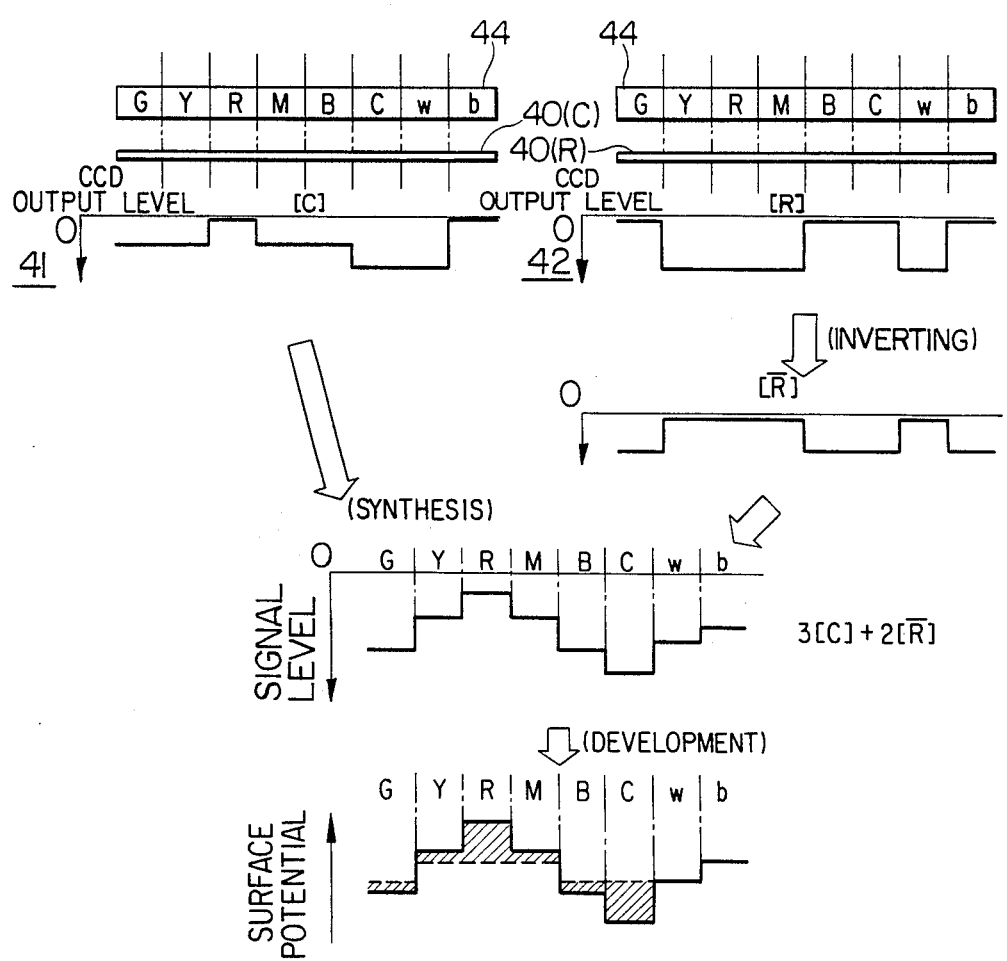
Figure 7A:
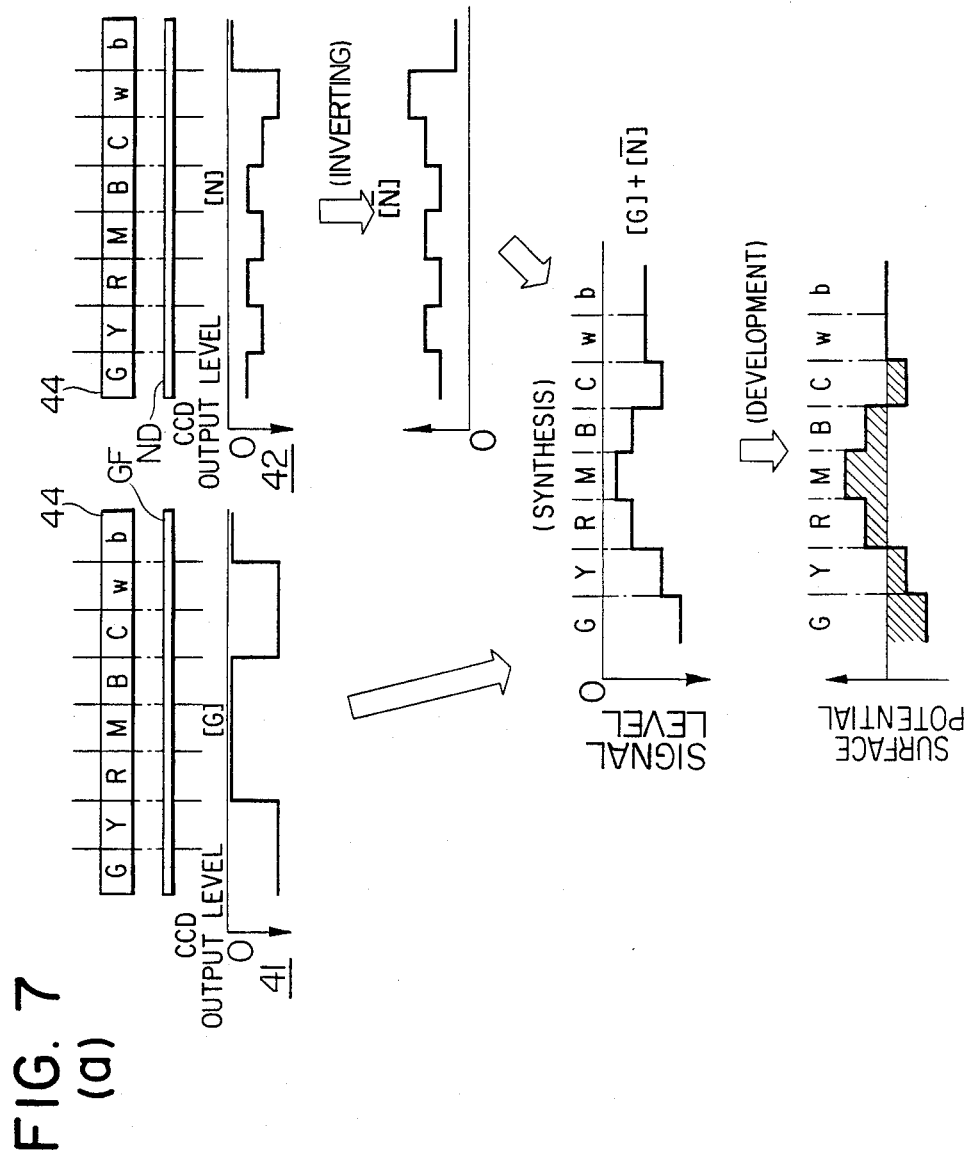

The output level chart in this instance is as shown in FIG. 7(a), wherein output [N] is obtained from CCD42 and output [G] from CCD41. If the output [N] is inverted to be synthesized with the output [G], all the chromatic color signal levels of G, C, Y and R, M and B are separated to be formed on both sides of the achromatic color signal levels of w and b.

This synthesized signal level $[S^*](a[G]+b[\overline{N}])$ and the level variable graph of $[Z](k[G]+(1-k)[\overline{N}])$ are expressed as follows:

| | Image color components | | | | | | |
|---|---|---|---|---|---|---|---|
| | G | Y | R | M | B | C | w | b |
| a[G] + b[$\overline{N}$] | $\frac{b}{3}$ | $\frac{2b}{3}$ | $a+\frac{b}{3}$ | $a+\frac{2b}{3}$ | $a+\frac{b}{3}$ | $\frac{2b}{3}$ | b | a |
| k[G] + (1 − k)[$\overline{N}$] | $\frac{1-k}{3}$ | $\frac{2-2k}{3}$ | $\frac{1+2k}{3}$ | $\frac{2+k}{3}$ | $\frac{1+2k}{3}$ | $\frac{2-2k}{3}$ | 1−k | k |

This is shown in FIG. 7(b). If 2/5 <k<1, also, all the chromatic color signal levels can be separated to be formed on both sides of the achromatic color signal levels. In this case, if k=½, [S*] is synthesized with a=b=1 (FIG. 7(a)).

Further as is apparent from FIG. 7(b), only the chromatic color signal levels of M and G, in the range of $$\frac{1}{4} < k \leq \frac{2}{5},$$

are specified to be separated from the achromatic color signal levels(w and b), but R, B and Y, C are not separated. In this instance, a=3 and b=7 can be selected.

In addition, in this synthesis, no chromatic color signals are produced which can be separated over the entire region of k regardless of the value of k.

As described previously, in the present invention, as to the separation of chromatic color signal levels from the achromatic signal levels, an original color image is first optically divided into two groups of color image information-having color signal levels, the signal levels are multiplied by constants, and then the synthesis and separation can be carried out, and thus the output level chart and level variable graph which suggest the procedure of synthesis are obtained. Of the chart and graph one that directly clear the synthesis procedure is the level variable graph, so that the graph alone will be used hereinafter for the description of examples of the method of this invention.

In addition, the symbols that will be used hereinafter are as defined previously.

Figure 8:
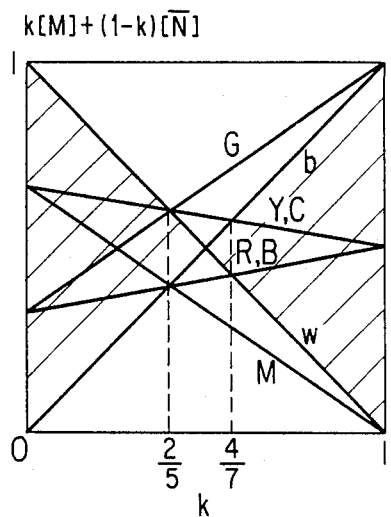
FIGS. 8, 9, 10, 11, 12 and 13 each is a graph showing level variables in the color image forming process other than that in the case of FIGS. 4 through 7.

Separation by $a[M]+b[\overline{N}]$:
 Half mirror:
  On the transmission side . . . magenta filter
  On the reflection side . . . ND filter (allowed to be omitted)
 In $[Z]=k[M]+(1-k)[\overline{N}]$ (FIG. 8),

| G | Y | R | M | B | C | w | b |
|---|---|---|---|---|---|---|---|
| $\left(\frac{1+2k}{3}\right)$ | $\left(\frac{2}{3}-\frac{k}{6}\right)$ | $\left(\frac{1}{3}+\frac{k}{6}\right)$ | $\left(\frac{2-2k}{3}\right)$ | $\left(\frac{1}{3}+\frac{k}{6}\right)$ | $\left(\frac{2}{3}-\frac{k}{6}\right)$ | $1-k$ | $k$ |

(a) $\frac{2}{5} < k < \frac{4}{7}$

All the chromatic color signal levels (G, Y, R, M, B and C) are separated from the achromatic color signal levels (w and b). In this case, e.g., a=b=1 may be used.

(b) $\frac{4}{7} \leq k < 1$

Specific chromatic signal levels (G and M) are separated from the achromatic color signal levels (w, b). In this case, e.g., a=3 and b=1 may be used.

In addition, in the $$0 < k < \frac{2}{5}$$

range, no chromatic color signal levels can be separated from the achromatic color signal levels.

Figure 9:
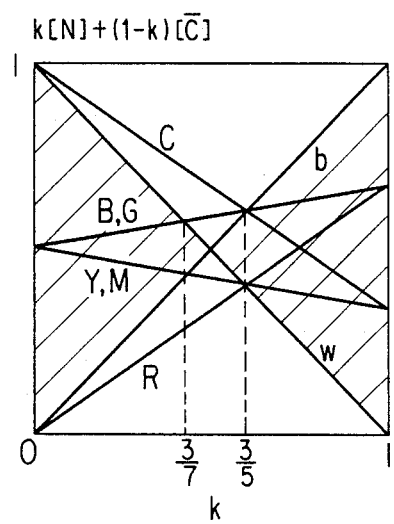

Separation by $[S^*]=a[N]+b[\overline{C}]$
Half mirror:
   On the transmission side . . . ND filter (allowed to be omitted)
   On the reflection side . . . Cyan filter
In $[Z]=k[N]+(1-k)[\overline{C}]$ (FIG. 9), (a) $\frac{3}{7} < k < \frac{3}{5}$ All the chromatic color signal levels are separated from the achromatic color signal levels. In this instance, e.g., a=b=1 may be used.

(b) $0 < k \leq \frac{3}{7}$

Specific chromatic color signal levels (C and R) are separated from the achromatic color signal levels.

In addition, in this $[S^*]$, in the $$\frac{3}{5} \leq k \leq 1$$

range, no chromatic color signal levels can be separated from the achromatic color signal levels.

Figure 10:
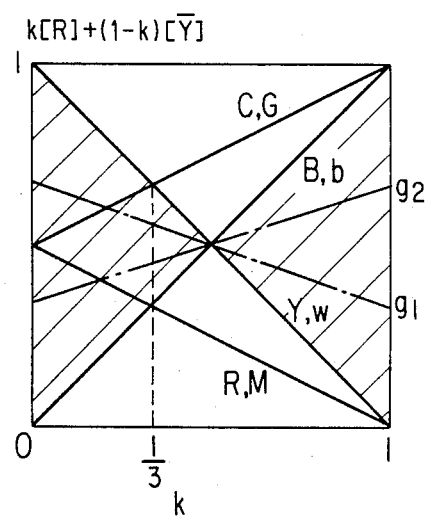

Separation by $[S^*]=a[R]+b[\overline{Y}]$:
Half mirror:
   On the transmission side . . . Red filter
   On the reflection side . . . Yellow filter
In $[Z]=k[R]+(1-k)[\overline{Y}]$ (FIG. 10), (a) $\frac{1}{3} \leq k < 1$ The chromatic color signal levels of C, G and R, M are separated from the achromatic color signal levels. In this instance, e.g., a=b=1 may be used.

In addition, the chromatic color signal levels of B and Y, since they fall on the achromatic color signal levels of b and w, respectively, over the whole region of k, cannot be separated therefrom.

Further, in the $$0 < k \leq \frac{1}{3}$$

range, no chromatic color signal levels can be separated.

Figure 11:
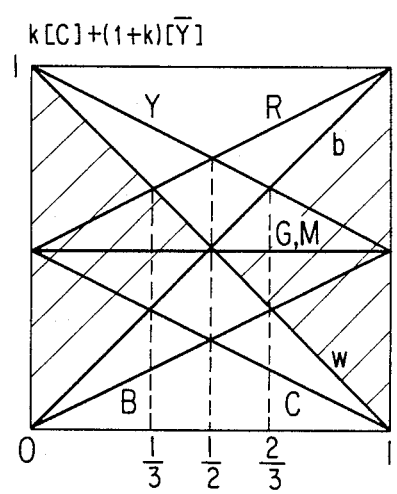

Separation by $[S^*]=a[C]+b[\overline{Y}]$:
Half mirror:
   On the transmission side . . . Cyan filter
   On the reflection side . . . Yellow filter
In $[Z]=k[C]+(1-k)[\overline{Y}]$ (FIG. 11), (a) $\frac{1}{3} < k < \frac{2}{3}$ The chromatic color signal levels of Y, R, B and C are separated from the achromatic color signal levels. In this case, e.g., a=b=1 may be used.

(b) $0 < k \leq \frac{1}{3}$

The chromatic color signals of Y and B alone are separated from the achromatic color signal levels. In this case, a=1 and b=2 may be used.

(c) $\frac{2}{3} \leq k < 1$

The chromatic color signal levels of R and C alone are separated from the achromatic color signal levels. In this instance, e.g., a=2 and b=1 may be used.

In this synthesized signal level $[S^*]$, the chromatic color signal levels are always ½ regardless of the value of k, and included in the achromatic color signal level region, and therefore it is impossible to separate the chromatic color signal levels therefrom.

Figure 12:
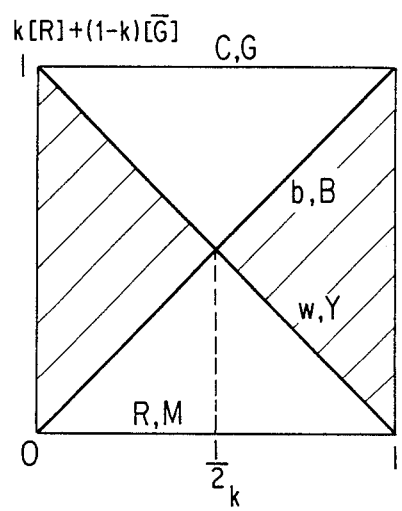

Separation by $[S^*]=a[R]+b[\overline{G}]$:
Half mirror:
   On the transmission side . . . Red filter
   On the reflection side . . . Green filter
In $[Z]=k[R]+(1-k)[\overline{G}]$ (FIG. 12),
(a) $0 < k < 1$ The chromatic color signal levels of C, G and R, M are separated from the achromatic color signal levels regardless of the value of k (provided, $0 < k < 1$). In this instance, e.g., a=b=1 may be used.

In addition, in this synthesized signal level $[S^*]$, the chromatic color signal levels of B and Y fall on the achromatic color signal levels of b and w, and therefore it is impossible to separate the chromatic color signal levels therefrom.

Figure 13:
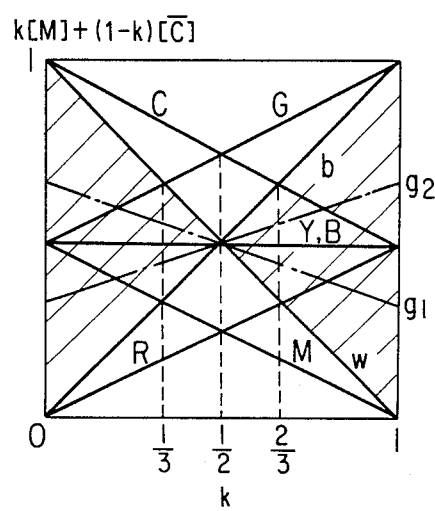

Separation by $[S^*]=a[M]+b[\overline{C}]$:
Half mirror:
   On the transmission side . . . Magenta filter On the reflection side . . . . .Cyan filter
In $[Z]=k[M]+(1-k)[\overline{C}]$ (FIG. 13), (a) $\frac{1}{3} < k < \frac{2}{3}$ The chromatic color signal levels of C, G, and R, M are separated from the achromatic color signal levels. In this case, a=b=1 may be used.

(b) $0 < k \leq \frac{1}{3}$

The chromatic color signal levels of C and R alone are separated from the achromatic color signal levels. In this instance, a=1 and b=2 may be used.

(c) $\frac{2}{3} \leq k < 1$

The chromatic color signal levels of M and G alone are separated from the achromatic color signal levels. In this case, e.g., a=2 and b=1 may be used.

In addition, the chromatic colors of Y and B are in the 0<k<1 range, and their chromatic color signal levels each is always ½ and included in the achromatic color signal level region, and therefore the separation of the chromatic color signal levels is impossible.

A number of examples based on the embodiment of this invention have been described above. The embodiment of this invention includes various types of separation of the components of color image information from an original image into two groups and synthesis of the separated groups, the types of two groups including, e.g., a group of primary colors and the other group of complementary or mixed colors thereof; monochromatic colors and different monochromatic colors; monochromatic colors and white; mixed colors and different mixed colors; and the like, and there also are still many similar type of separation and synthesis.

The above-mentioned similar types and advancing them up to a necessary stage are together included in the embodiment of the present invention. Further, in the toner development stage that will be described hereinafter, the color separation for the synthesis [S*] into which the reversal relation is introduced by the combined use of the development bias or constant electrostatic charging can be further secured, and even in the case of the synthesis [S] into which no reversal relation is introduced, chromatic color signal levels can be easily separated from the achromatic color signal levels.

An example of the case where the electrical bias applying to the developing zone is used in combination will be explained.

Figure 14:
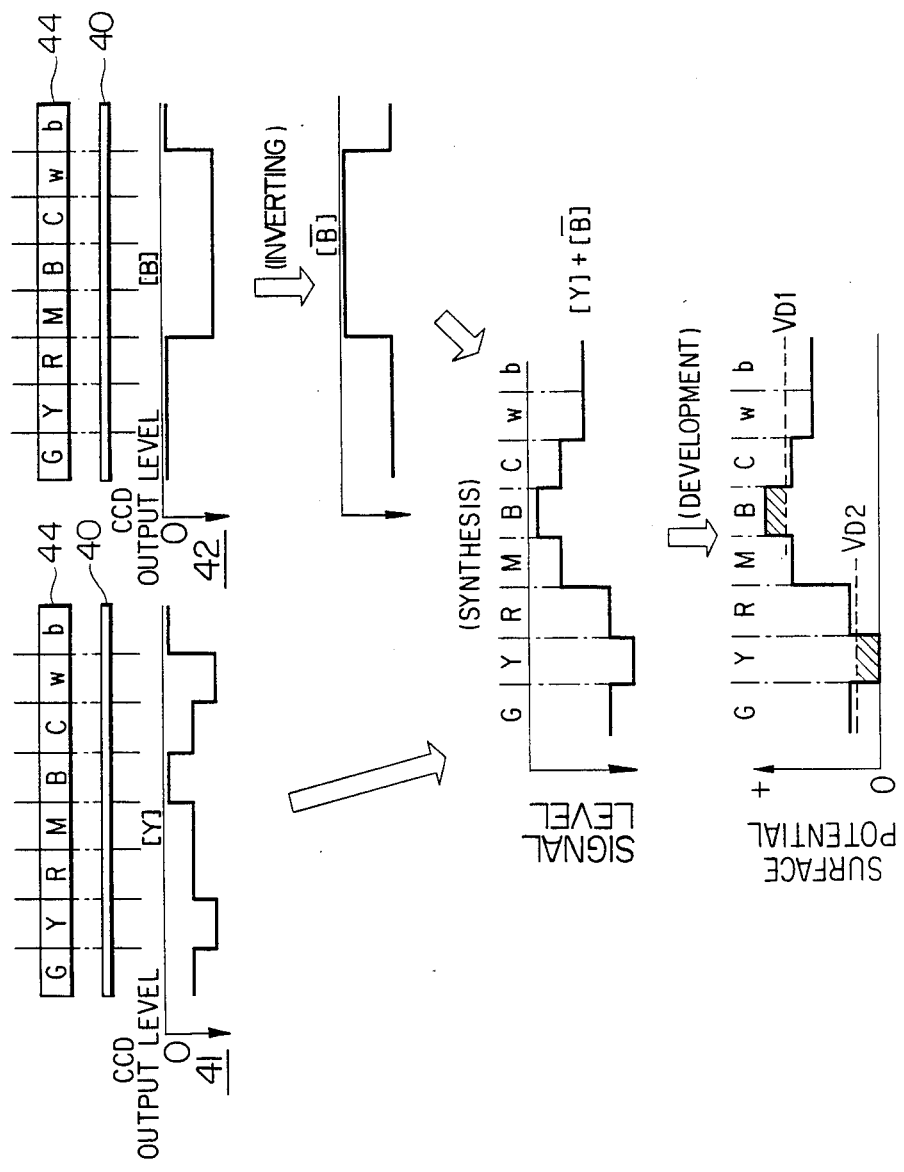
FIG. 14 shows output level charts where a development bias is used in combination.

In accordance with the previous procedure, $[S^*]=[\overline{B}$ is synthesized, and on the basis of this [S*], lights in quantities corresponding to the respective color signal levels are emitted from latent image forming means 31, and photoreceptor drum 1 is exposed imagewise to the lights, and thus a latent image for the respective colors consisting of the potentials corresponding to the output level chart of synthesized signal level shown in FIG. 14.

The thus obtained synthesized color signal level or electrostatic latent image has a first group of chromatic color signal levels (M, B and C) and a second group of chromatic color signal levels (G, Y and R) formed on both sides of the achromatic color signal levels (w and b), and these are separable from the achromatic color signal levels.

And in the subsequent development, if the development bias (voltage) is set to $V_{D1}$ or $V_{D2}$, for example, the blue color signal level (B) or yellow color signal level (Y) alone is selected, and either of these colors alone is selectively developed to form a visible image (the oblique-lined area in FIG. 14 represents the developable region).

Figure 15A:
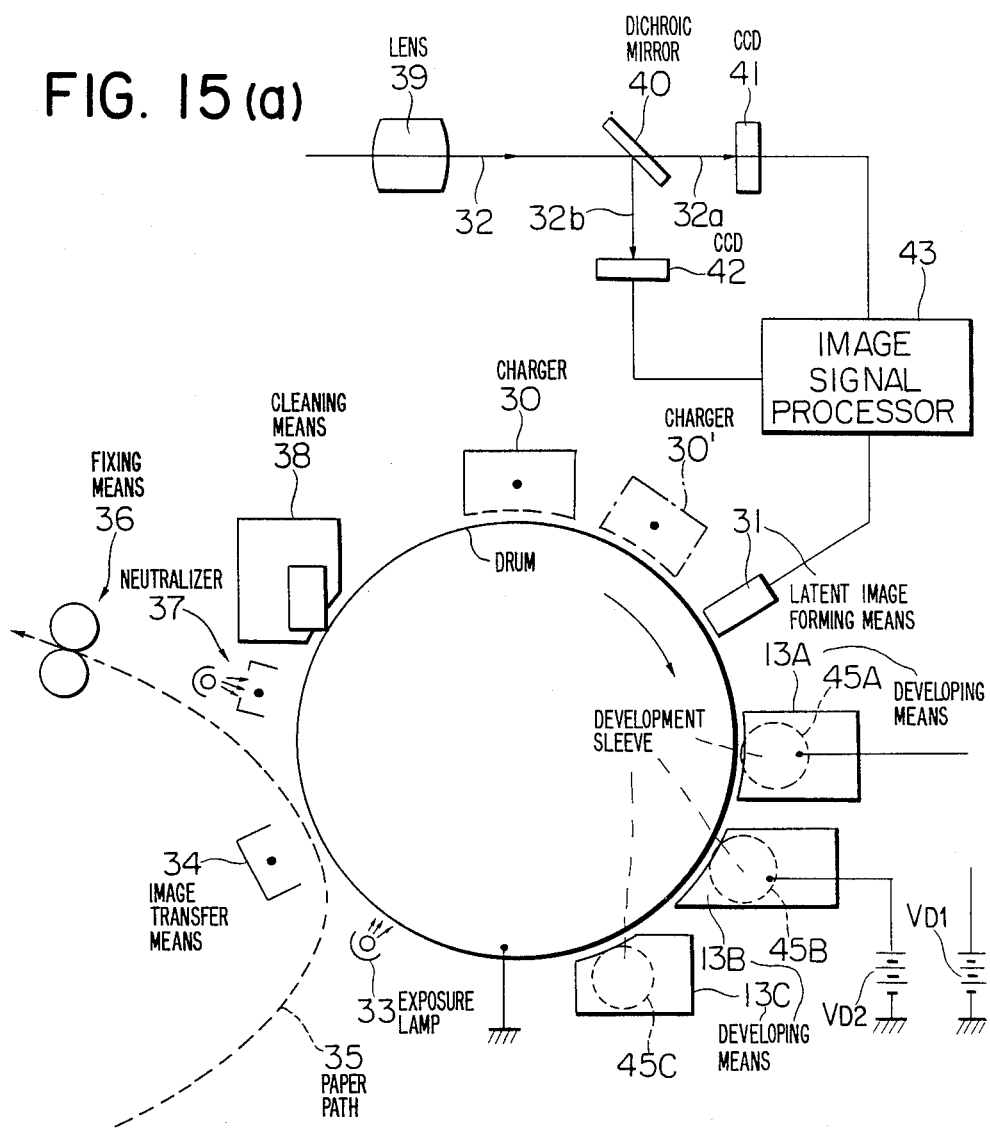
FIG. 15 is a schematic drawing showing a color image forming apparatus where a development bias is used in combination.
Figure 15B:
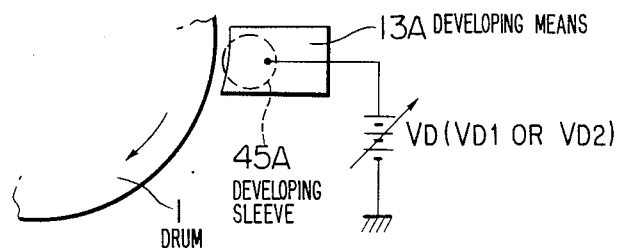

In order to selectively form a specific color signal level in this way, as is shown in FIG. 15(a), the respective developing means, e.g., 13A and 13B, has development sleeves 45A and 45B, and D.C. voltages $V_{D1}$ and $V_{D2}$ are applied to between 45A and grounding level and between 45B and grounding level, respectively. In this instance, a negatively charged toner is put in developing means 13A and positively charged toner in 13B. There are various ways to apply the development bias; for example, as is shown in FIG. 15(b), the manner of making D.C. bias $V_D$ variable to select $V_{D1}$ or $V_{D2}$ may be useful.

Figure 16:
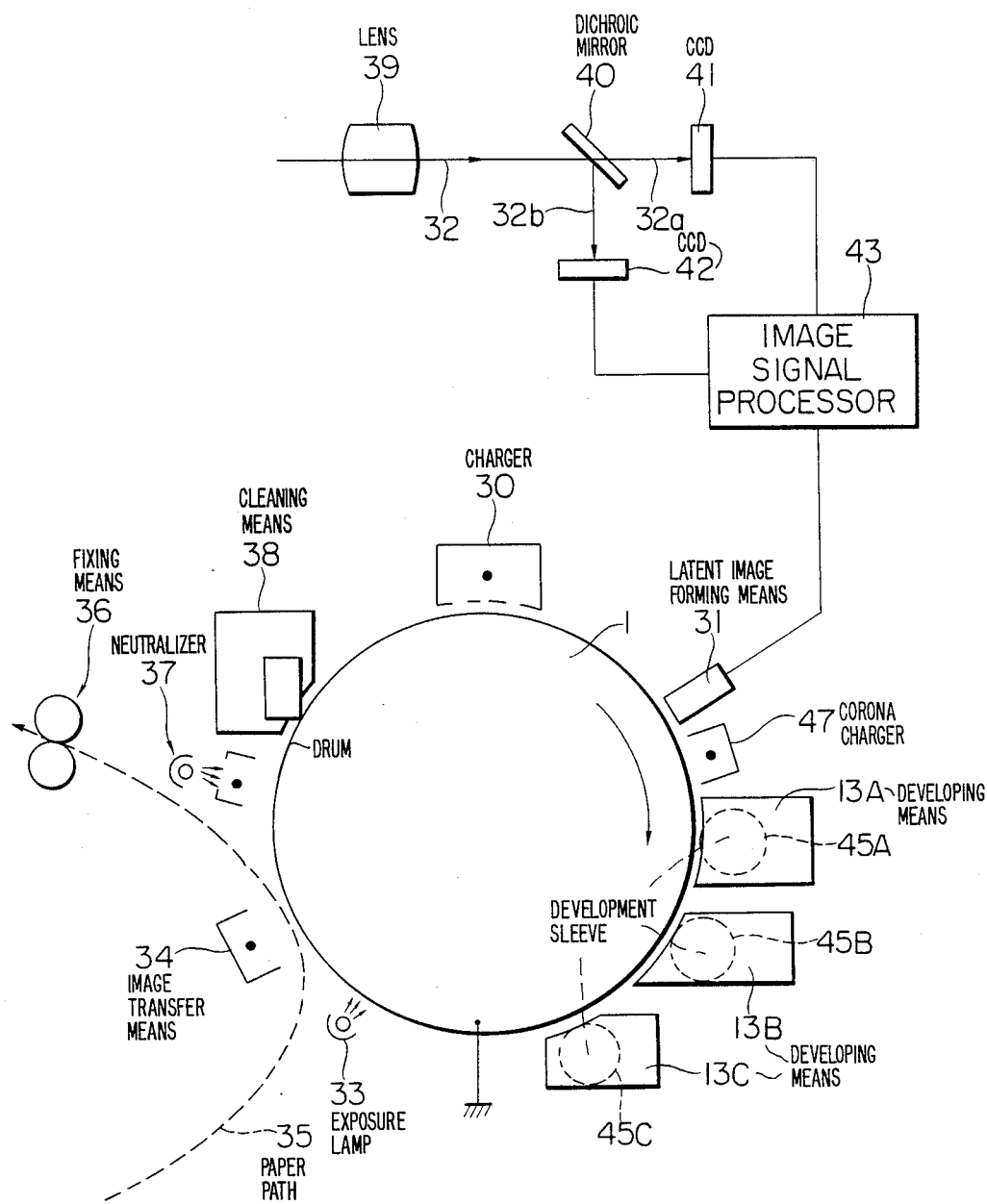
FIG. 16 is a schematic drawing showing a color image forming apparatus where constant electrostatic charging is used in combination.
Figure 17:
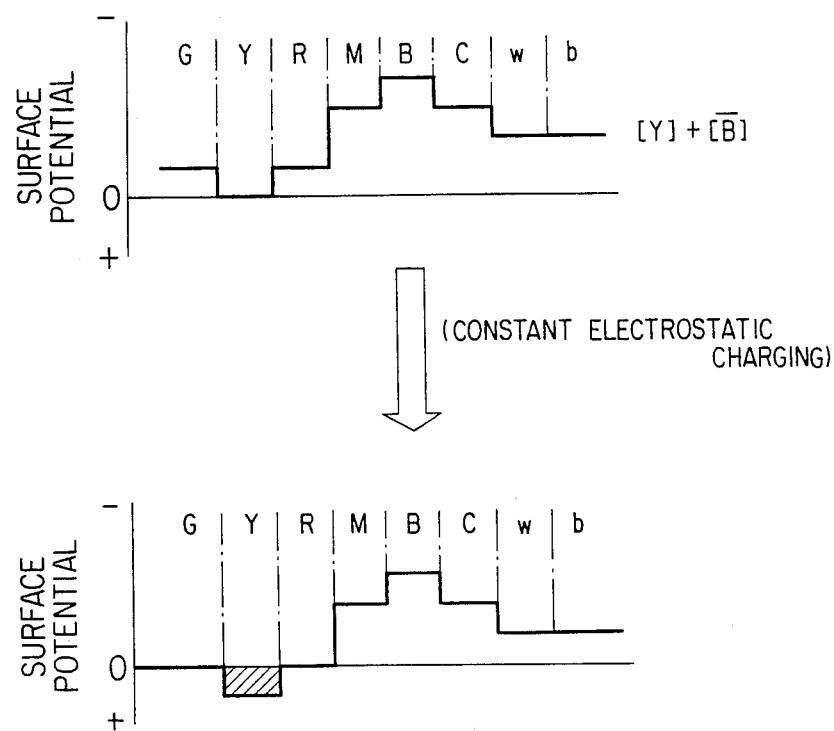
FIG. 17 shows output level charts of the color image forming apparatus of FIG. 16.

FIGS. 16 and 17 show an example in which as the means to select a specific color signal level a constant electrostatic charging is used in place of the above development bias. That is, after a synthesized information is formed in the same manner as in above on photoreceptor drum 1, the entire area of the photoreceptor drum is negatively charged constantly by electrostatic charging electrode (e.g., corona charger) 47. As a result, as is shown in FIG. 17, the electric potential of the whole synthesized information is lowered and the yellow color signal level [Y] alone shows positive polarity, so that this can be selectively visualized by the subsequent developing process.

Figure 18:
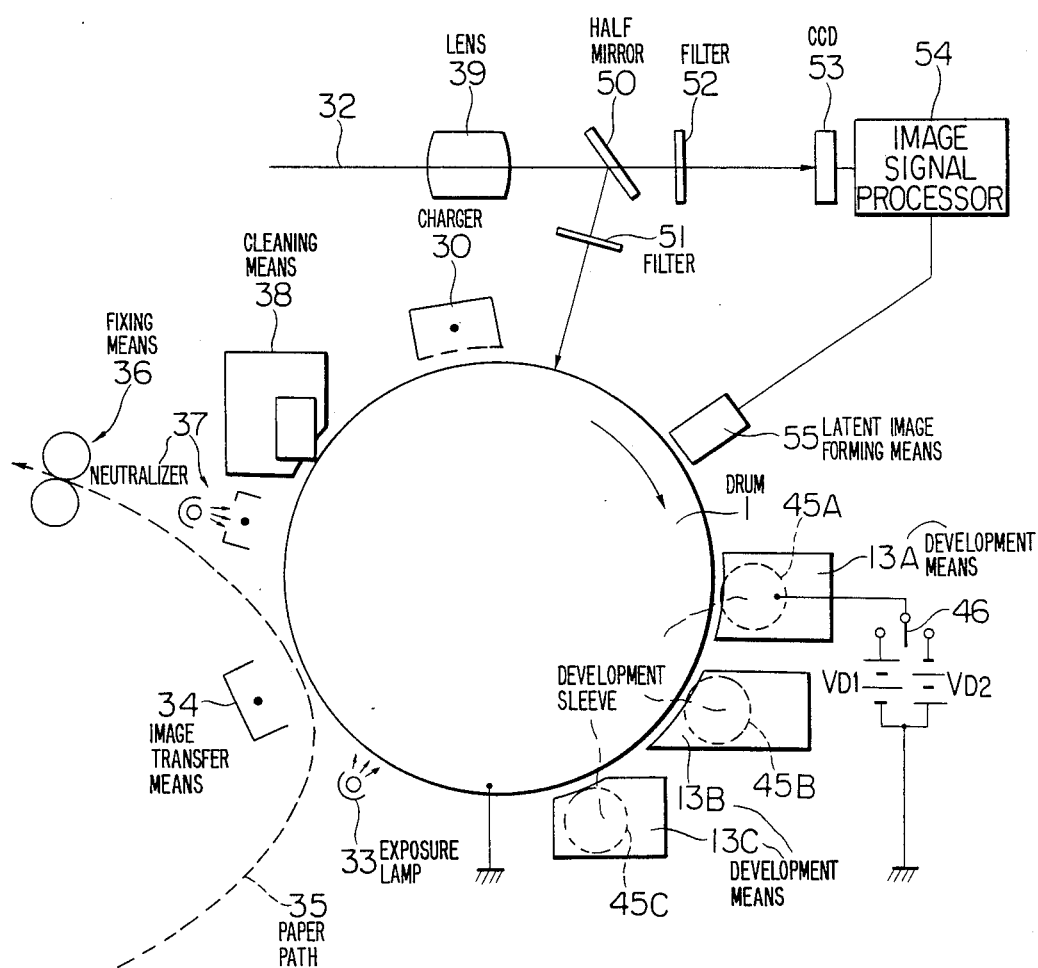
FIG. 18 is a schematic drawing showing a different color image forming apparatus where a development bias is used in combination.

Reference is now made to FIG. 18 for the description of another image forming apparatus. In this example, however, description of those common to FIG. 15 will be omitted with only the application of common symbols.

According to this example, a half mirror 50 is arranged in the path of the light from an original image. While the reflected light from the half mirror is led through a filter 51 to be incident upon photoreceptor drum 1, the light transmitted through the half mirror 50 is led through a filter 52 to be incident upon CCD53, and the output from the CCD is processed in an image signal processor 54, and then the processed signal is fed into an electrostatic recording means 55 such as a multistylus or ion control electrode, etc. In producing a recording signal output from the recording means 55 to the photoreceptor drum, the image information which was transmitted through filter 51 and the recording means 55 are synchronized on the photoreceptor drum by the image signal processor.

Figure 19:
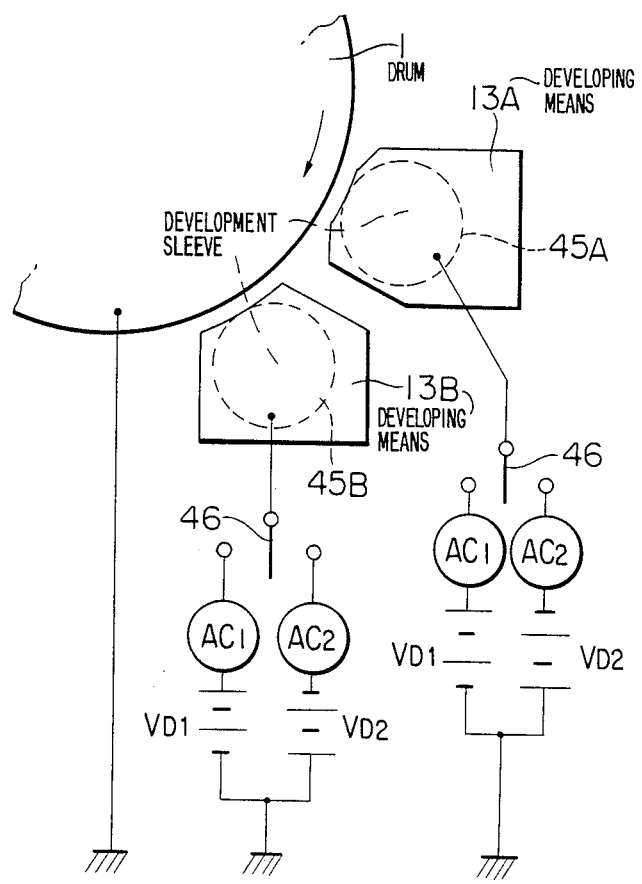
FIG. 19 is a drawing showing the development section of another color image forming apparatus.
Figure 20:
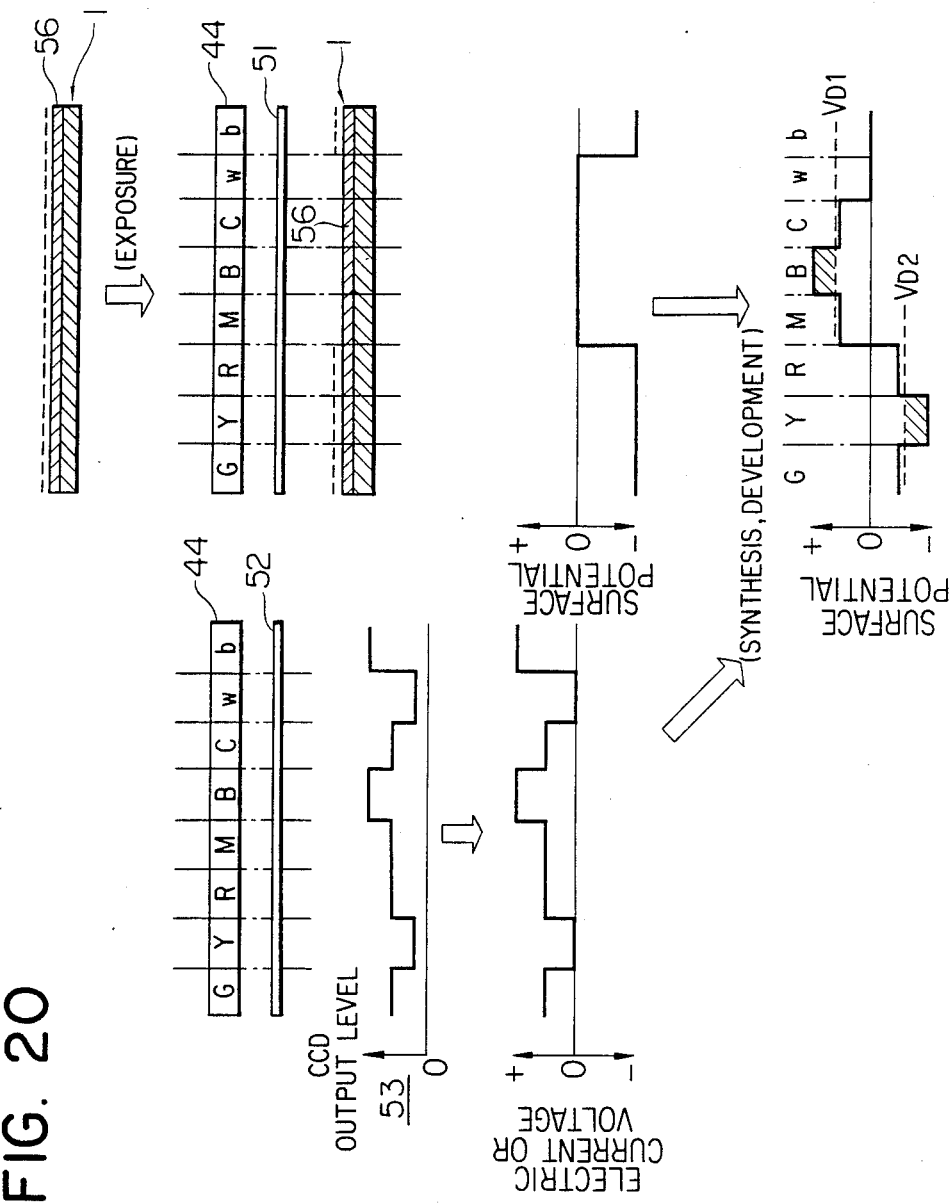
FIG. 20 is a diagram showing the process including output level charts where the color image forming apparatus of FIG. 18 is used.

Referring to FIG. 20 for this process, by using a blue filter as the filter 51, the lights from the B, M, C and w sections of an original are made incident upon the photosensitive layer 56 of the already overall negatively charged photoreceptor drum 1 to eliminate selectively the negative charge on the surface of the drum. On the other hand, by using an yellow filter as the above filter 52, an output as shown in the drawing is obtained from CCD53, and processed in the image signal processor 54 to be converted into the voltage to be applied to the electrostatic recording means 55 or into the ionic current to the photoreceptor. And when the recording information by the recording means 55 and the image information on the photoreceptor are synthesized on the photoreceptor, as shown in the drawing, the chromatic color signal levels of a group of M, B and C and a group of G, Y and R separated to be formed on both side of the white color signal level of w and black color signal level of b can be obtained. Further, from these levels the blue color signal level (B) and yellow color signal level (Y) are selected by the development bias $V_{D1}$ or $V_{D2}$ and developed. For this reason, as shown in FIG. 19, the respective developing means may be provided with a switch 46 for selecting $V_{D1}$ or $V_{D2}$. The D.C. bias $V_{D1}$ or $V_{D2}$ may be connected with A.C. bias $AC_1$ or $AC_2$, respectively. The addition of the A.C. bias activates the alternating electric field produced in the developing region to unravel the developer to exert an effect such as the improvement of image density.

In the example shown in FIGS. 18 through 20, a plurality of components of image information are digitally obtained on the one hand and analogously obtained on the other hand, but they have the inverted relation with each other in respect that two pieces of image information are in the positive and negative forms on the photoreceptor drum.

Figure 21:
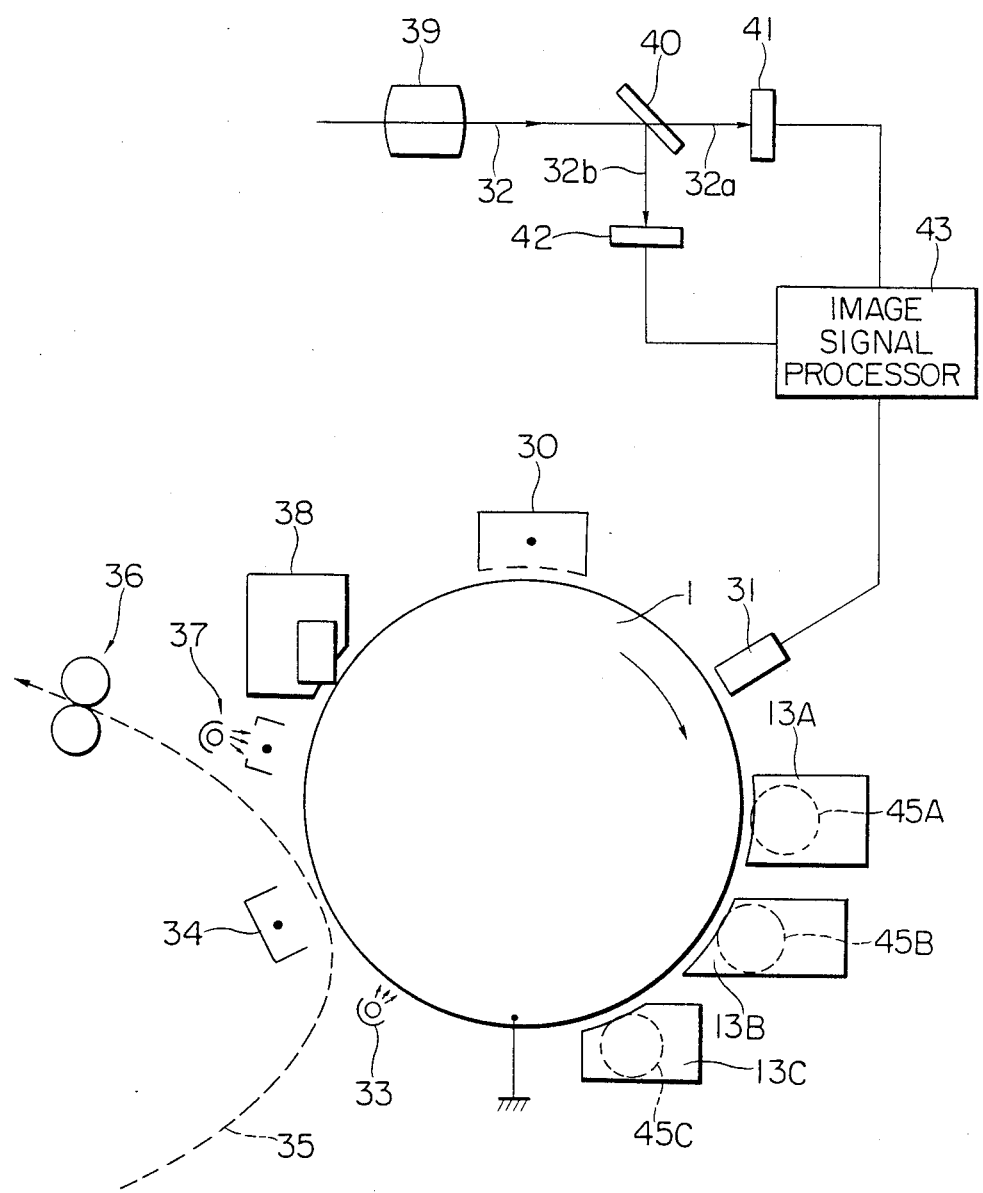
FIG. 21 is a schematic drawing showing still another color image forming apparatus.
Figure 22:
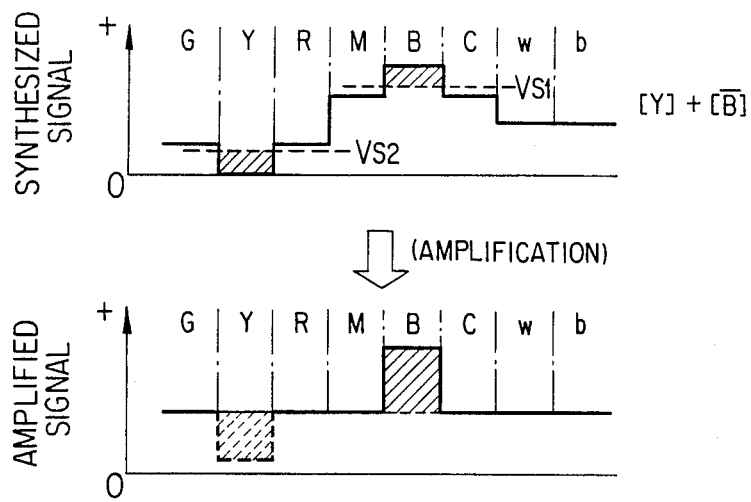
FIG. 22 shows output level charts where the apparatus of FIG. 21 is used.

FIGS. 21 and 22 show still another example. This is so constructed that the selection of the above color signal levels are performed in image signal processor 43 that functions to reverse and synthesize components of color image information. Accordingly, the example has no such constant electrostatic charging means as mentioned above.

That is, in image signal processor 43, as in the example of FIG. 14, a synthesized signal level $[S^*]([Y]+[\overline{B}])$ is obtained, and at the same time, as in FIG. 22, of the color signal levels the ones other than the blue color signal level (B) and yellow color signal level (Y) are cut out. For this reason a comparator is provided to the signal processor 43 to select the specific color signal level [B] or [Y] by reference voltages $V_{S1}$ and $V_{S2}$. Either of these selected color signal levels is then amplified sufficiently by an amplifier.

And, on the basis of the amplified color signal level, on the photoreceptor drum 1 the corresponding electrostatic latent image is formed by latent image forming means 31, and the latent image is developed in the subsequent development process, whereby a blue or yellow visible image is selectively obtained.

Figure 23:
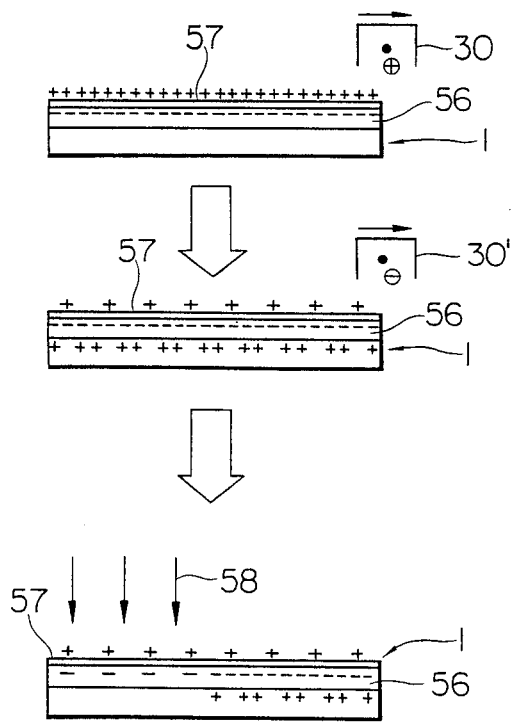
FIG. 23 is a drawing showing the process of forming a different color image.
Figure 24:
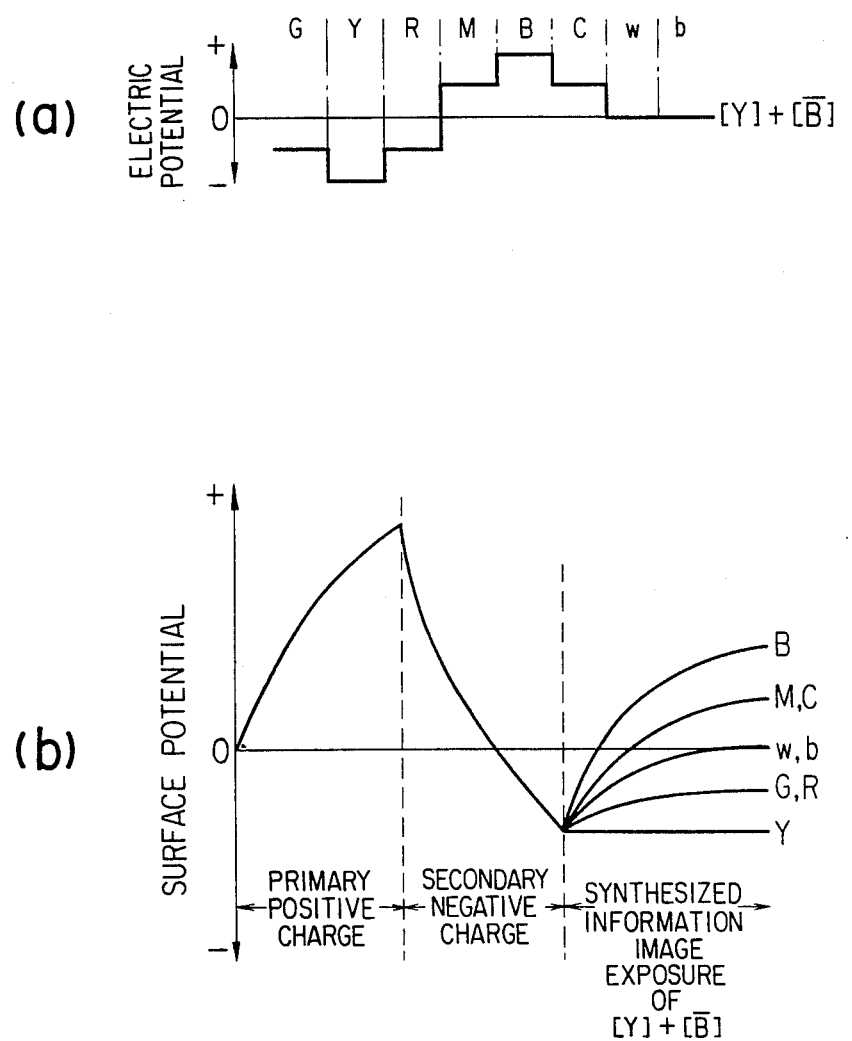
FIGS. 24(a) is an output level chart, and 24(b) is a drawing showing electric potentials

Reference is now made to FIGS. 15, 23 and 24 for an example of the application of the present invention to an NP photoreceptor of the prior art.

In this process, as shown in FIG. 23, one having an insulating layer 57 thereon is used as the photoreceptor 1, and a secondary charger 30' indicated with a broken line in FIG. 15 is used as the charger to be added behind the primary charger 30. And the primary charger 30 positively charges the entire surface of photoreceptor 1, while the secondary charger 30' negatively charges the entire surface of the same. And then, if an imagewise exposure 58 corresponding to the synthesized information $[Y]+[\overline{G}]$ of FIG. 24(a) obtained by image signal processor 43 as shown in FIG. 15 is made by latent image forming means 31, then the charge pattern formed on the photoreceptor 1 according to the synthesized information is as given in FIG. 24(b). As a result, as in the case of FIG. 20, opposite-polarity chromatic color signal levels of a group of B, M and C and another group of Y, G and R are separated to be formed on both sides of the achromatic color signal levels to thereby enable the selective development of desired colors as in the above manner.

In addition, where the NP photoreceptor is used, a charge pattern other than the above one can also be obtained; for example, a negative pattern by forming all the color signal levels on one polarity side can be obtained, or the same pattern as in FIG. 24 or negative or positive pattern by positive or negative polarity can also be obtained by simultaneous exposure at the time of the secondary charging.

The following is an example of the application of this invention to a color image forming apparatus which uses a photosensitive screen.

Figure 25:
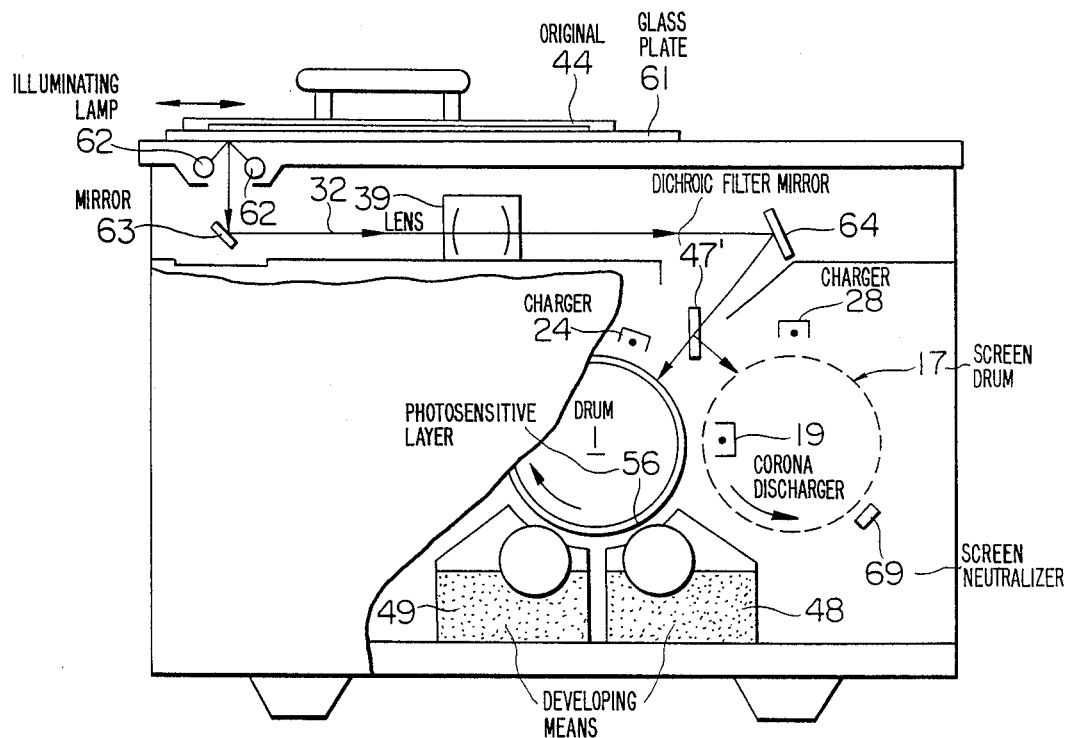
FIG. 25 is a schematic drawing showing a color image forming apparatus in which a photosensitive screen is used.

As is shown in FIG. 25, on the apparatus is provided a receprocatingly movable document glass plate 61. An original 44 placed on the document glass plate 61 is illuminated by an illuminating lamp 62. The numbered 63 and 64 are mirrors, 39 is a fixed lens, and 47' is a movable dichroic filter mirror that reflects a given chromatic light and allows the transmission therethrough of the light having the complementary color relation with the chromatic light and is arranged so as to get in and out of the optical path. The drum-like photoreceptor 1 has on the surface thereof a photosensitive layer 56. When the photoreceptor drum rotates clockwise, the photosensitive layer 56 is uniformly charged by a corona charger 24. The photosensitive layer 56 is made of an organic semiconductor or the like.

Around the photoreceptor 1 are arranged a charger 24 that uniformly charges the photosensitive layer 56, developing means 48, 49, . . . which contain various color toners (in practice, the required number of developing means for desired colors out of G, Y, R, M, B, C and b are to be arranged, but in the drawing only two developing means are indicated as an example), and the like.

Figure 26A:
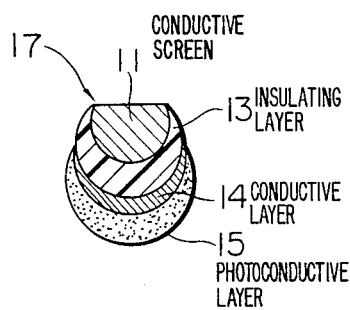
FIGS. 26A and 26B are enlarged cross-sectional views of the grid element of the photosensitive screen.

On the other hand, outside the photoreceptor drum a photosensitive screen drum 17 is arranged so that the photoconductive layer thereof faces opposite to the photoreceptor drum, the drum 17 being arranged so as to rotate counterclockwise synchronously with document glass plate 61 and photosensitive layer 56. Also, on the periphery of the drum 17 are arranged screen charger 28, screen neutralizer 69 made of an EL (electroluminescence) plate or an AC corona neutralizer, etc., and charge particle source (corona discharger) 19 that shoots charge particles at the point inside the screen drum 17 facing opposite to the photoreceptor 1. The photosensitive screen 17 has a large number of fine aperture 10 as partly shown in FIGS. 26A and 27A, and comprises a conductive screen 11 such as of stainless steel one side of which is exposed and the other side of which is provided with an insulating layer 13 such as of methacrylic resin, etc., on which is further provided with a conductive layer for bias 14 such as of aluminum and a photoconductive layer such as of azo dyes, selenium-type material, amorphous silicon, cadmium sulfide, zinc oxide, etc.

Figure 26B:
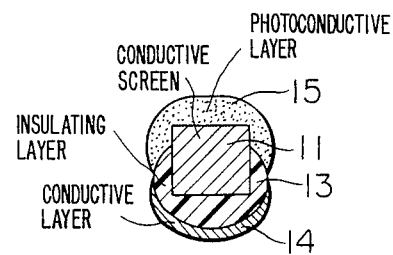

In addition, the photosensitive screen 17 is allowed to be of a different construction such as, for example, the construction as shown in FIG. 26B. Further, other constructions of the prior art may also be used.

Figure 27A:
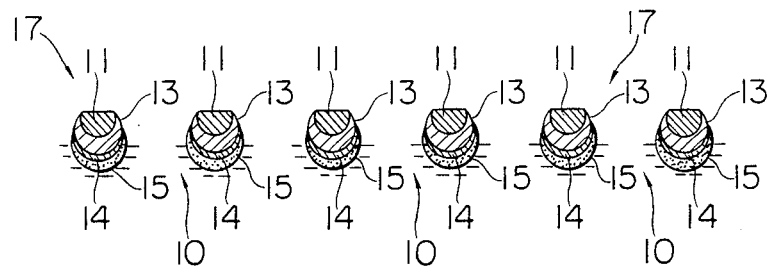
FIGS. 27A, 27B and 27C are drawings showing the color image formation with the cross-sectional views of the photosensitive screen.
Figure 27B:
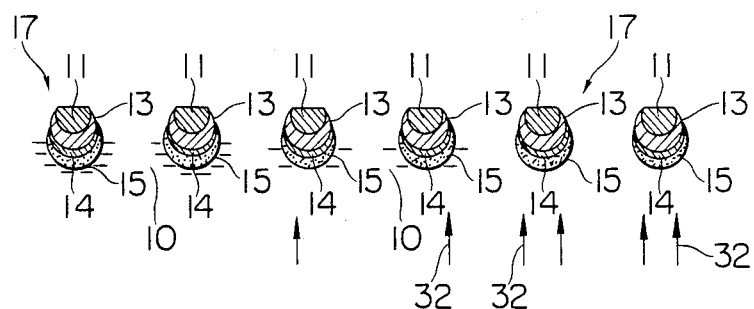
Figure 27C:
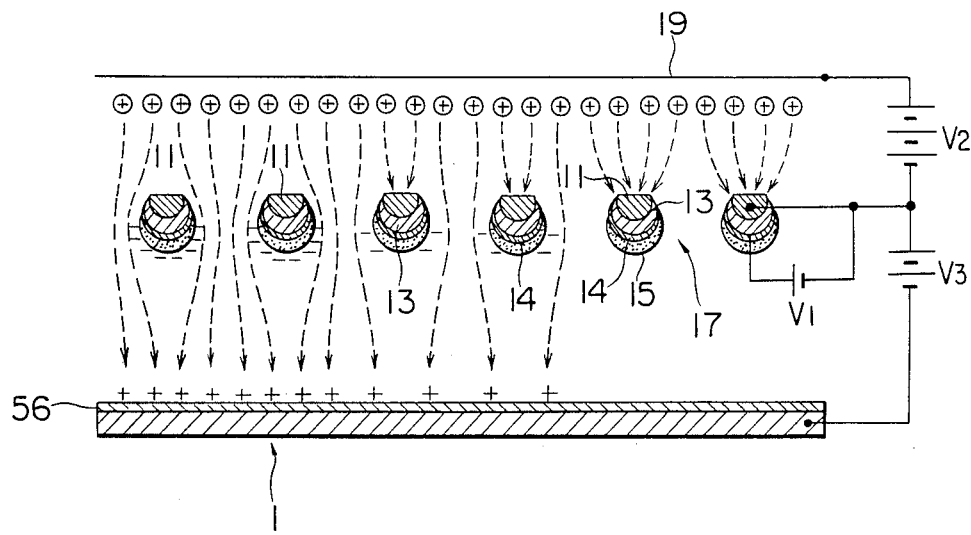

FIG. 27 shows the process of forming a positive latent image by selectively attaching charge onto photoreceptor drum by the above photosensitive screen 17. Firstly, as shown in FIG. 27A, the entire surface of the photoconductive layer 15 of photosensitive screen drum 17 is negatively charged by the above charger 28, and secondly, as shown in FIG. 27B, the negative charge is selectively eliminated or reduced by imagewise exposure light 32. Further, as shown in FIG. 27C, when the above-mentioned charge particle source 19 shoots positive ion particles at the photosensitive screen 17, the positive ion particles pass through the negatively charged region to attach in a given quantity and in a given pattern form onto the photosensitive layer 56, thereby forming a positive-polarity electrostatic latent image. In addition, in the drawing, $V_1$ is a bias supply, $V_2$ is a power supply for discharge, and $V_3$ is a D.C. power supply.

Figure 28:
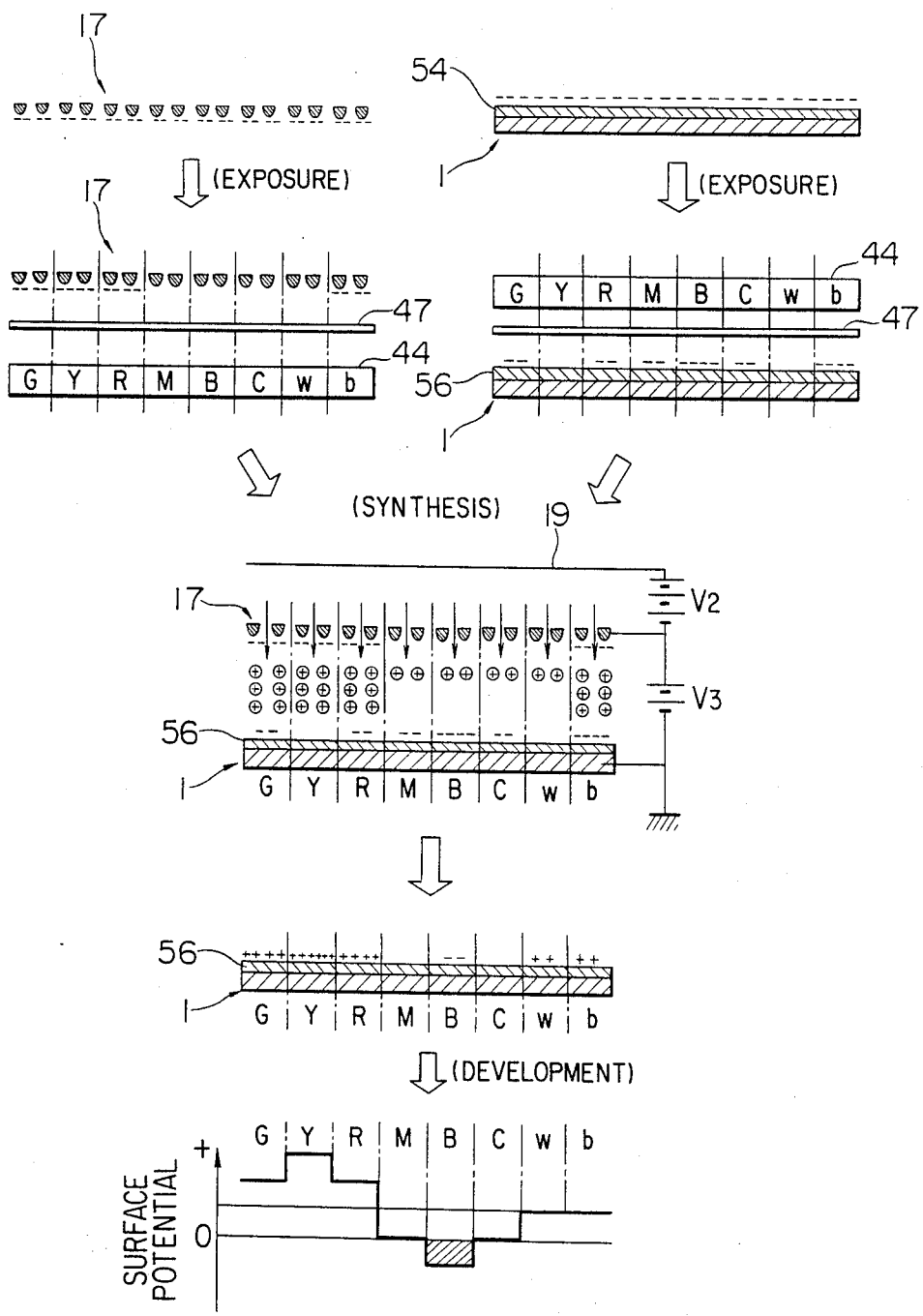
FIG. 28 is a drawing showing the process including output level charts where the apparatus of FIG. 25 is used.
Figure 29:
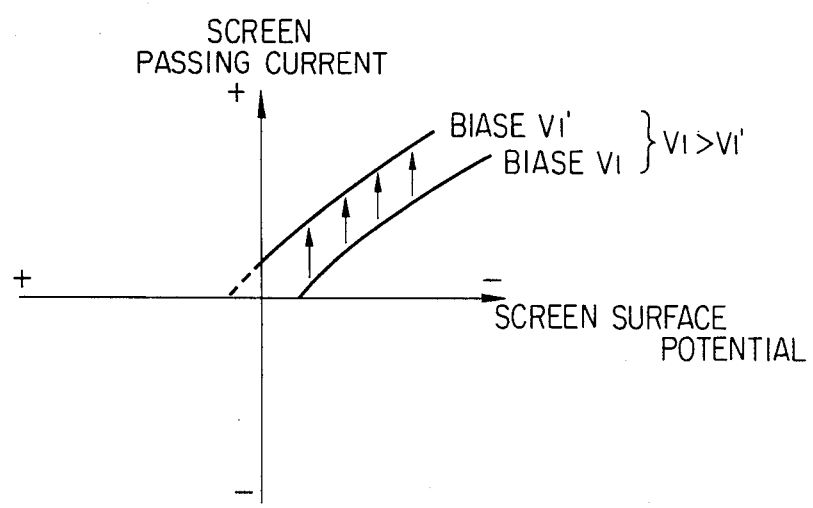
FIG. 29 is a graph showing the change in the transit current by the bias of the photosensitive screen.

Reference is now made to FIGS. 28 and 29 for illustrating the image forming process which uses photosensitive screen 17, provided the screen is schematically shown in the drawings.

The photosensitive screen 17 and photosensitive layer 56 are first overall negatively charged, and then exposed to the light from an original 44. In this case, as the foregoing dichroic filter mirror 47' one functioning to reflect the B component light out of the reflected light from an original and to allow the transmission therethrough of the G and R component lights is used. As a result, as shown in the drawing, a given quantity of negative charge remains in a pattern form on the photosensitive screen 17 and photosensitive layer 56. After that, when the charge particle source 19 shoots positive ion particles, the positive ion particles pass through the negatively charged region of positive screen 17 and reach the photosensitive layer 56, whereby a newly synthesized electrostatic latent image from the negative charge and the positive charge that has passed through the photosensitive screen 17 is formed on the photosensitive layer 56. In FIG. 28, the bias of photosensitive screen 17 is not shown, but in practice, as in FIG. 27C, bias $V_1$ is applied to the photosensitive screen 17 to control the flow of the above positive ion particles.

That is, as shown in FIG. 29, if bias $V_1$ is controlled to be, e.g., a slightly low bias $V'_1$, the ion particles passing through the photosensitive screen (passing current) increases. Consequently, a given quantity of positive ion particles pass through even the part where the screen surface potential is zero. Therefore, on the photoreceptor 1 is formed an electrostatic latent image comprised of the achromatic color signal levels of w and b on both sides of which are formed the chromatic color signal levels separated into a group of [G], [Y] and [R] and a group of [M], [B] and [C], but the blue color signal level of [B] alone becomes of negative polarity. In other words, the blue color signal level is selected by bias $V'_1$, and visualized by a positive-polarity toner in the subsequent developing process.

In addition, in this process, when the charge image (image information [Y]) on the photosensitive layer 56 after imagewise exposure and the charge image (image information [B]) on the photosensitive screen 17 are synthesized, the polarity of the image information [B] is inverted by the positive ion particles from particle source 19, whereby a synthesized information ([Y]+[B̄]) is obtained.

The examples of the present invention have been described above, but are further modifiable on the basis of the technical idea of this invention. For example, the image information for use in the synthesis as one of process is allowed to comprise not less than three different components of image information, and in order to effect the synthesis, the optical means may be variously modified. Further the method of the synthesis also is not limited to the above-described ones. Furthermore, the above-described manners of selecting specific color signal levels may also be modified; for example, desired color signal levels may be selected by adding a given voltage (or current) to the output voltage (or current) of the latent image forming means such as the multistylus, ion flow control electrode, etc.

The present invention, as has been described, is such that a plurality of components of image information are obtained through optical means, of which the chromatic color signal levels are processed so as to be separably synthesized from the achromatic color signal levels, and further, from the synthesized information specific color signal levels can be selected up to a necessary stage, and therefore an image corresponding to the condition of desired colors being clearly separated can be reproduced.

What is claimed is:

1. A method of producing a synthesized color output from a color image original, comprising the steps of:

exposing the color image original to a light source;

generating a first color input and a second color input from the light-exposed color image original, wherein said first and second color inputs represent respective exposures of the color image original in two different ranges of light wavelengths;

converting said first color input to a first output level signal having a plurality of component level signals representing converted output levels of selected chromatic components and black and white components of said first color input;

converting said second color input to a second output level signal having a matching plurality of component level signals as said first output level signal representing converted output levels of the selected chromatic components and black and white components of said second color input;

processing said first and second output level signals to produce a synthesized output level signal having a matching plurality of synthesized component level signals by multiplying said first output level signal by a selected first constant "a" and multiplying the inverse of said second output level signal by a selected second constant "b" and adding said multiplied output level signals together, wherein said first constant and said second constant are selected in the predetermined ratio:

$$a:b=k:(1-k),$$

where $0<k<1$, such that the output levels of at least some of the selected synthesized chromatic components are separated in levels higher or lower than the output levels of the synthesized black and white components; and producing a synthesized color output based upon the synthesized chromatic components of said synthesized output level signal in accordance with their respective levels of separation from the synthesized black and white components.

2. A method according to claim 1, wherein said first and second constants are selected so that the output levels of all of said synthesized chromatic components are higher or lower than the synthesized black and white components.

3. A method according to claim 1, wherein said first and second constants are selected so that the output levels of part of said synthesized chromatic components lie between the levels of said black and white components, and the remainder of said synthesized chromatic components are higher or lower than the levels of said black and white components.

4. A method according to claim 1, wherein said first and second constants are selected so that the output levels of part of said synthesized chromatic components are equal to the levels of said black and white components, and the remainder of said synthesized chromatic components are higher or lower than the levels of said black and white components.

5. A method according to claim 1, wherein said providing step is carried out using a dichroic mirror for dividing the light from the exposed color image original into said first and second color inputs having different ranges of wavelengths which are complementary color light.

6. A method according to claim 1, wherein said providing step is carried out using a half mirror for dividing the light from the exposed color image original into two parts and passing the light of at least one of the two parts through a filter to obtain said first and second color inputs having different ranges of wavelengths.

7. A method according to claim 1 adapted for reproducing a color image copy from the color image original using an electrophotographic process, wherein said synthesized color output is applied to expose a latent image on a photoreceptor and said latent image is developed into a color image copy using a plurality of color toner developers.

8. A method according to claim 7, wherein said color development step comprises applying a bias voltage to at least one of said color toner developers in order to selectively form a specific color level image on said color image copy.

9. A method according to claim 7, wherein said color development step comprises applying a constant electrostatic charge to said photoreceptor in order to selectively form a specific color level image on said color image copy.

* * * * *